(12) United States Patent
Pederson

(10) Patent No.: US 6,462,669 B1
(45) Date of Patent: Oct. 8, 2002

(54) REPLACEABLE LED MODULES

(75) Inventor: John C. Pederson, St. Cloud, MN (US)

(73) Assignee: E. P. Survivors LLC, St. Cloud, MN (US)

( * ) Notice: Subject to any disclaimer, the term of this patent is extended or adjusted under 35 U.S.C. 154(b) by 0 days.

(21) Appl. No.: 09/605,801

(22) Filed: Jun. 28, 2000

Related U.S. Application Data

(63) Continuation-in-part of application No. 09/539,189, filed on Mar. 30, 2000, now Pat. No. 6,380,865.
(60) Provisional application No. 60/127,959, filed on Apr. 6, 1999.

(51) Int. Cl.[7] ................................................. G08B 5/22
(52) U.S. Cl. .......................... 340/815.45; 340/815.47; 340/321; 362/800; 315/200 A
(58) Field of Search ....................... 340/815.45, 815.47, 340/321; 362/800; 315/200 A

(56) References Cited

U.S. PATENT DOCUMENTS

| | | | |
|---|---|---|---|
| 3,701,043 A | 10/1972 | Zuleeg et al. ............... | 331/94.5 |
| 3,863,075 A | 1/1975 | Ironmonger et al. ........ | 250/552 |
| 3,889,147 A | 6/1975 | Groves ....................... | 313/500 |
| 4,149,111 A | 4/1979 | Coates, Jr. ................ | 315/169.4 |
| 4,243,985 A | 1/1981 | Quayle ....................... | 340/753 |
| 4,298,806 A | 11/1981 | Herold ....................... | 250/504 |
| 4,301,461 A | 11/1981 | Asano ......................... | 357/17 |
| 4,319,306 A | 3/1982 | Stanuch ...................... | 362/35 |
| 4,342,944 A | 8/1982 | Spring Thorpe ............ | 313/499 |
| 4,390,931 A | 6/1983 | Gorick et al. ............... | 362/267 |
| 4,445,132 A * | 4/1984 | Ichikawa et al. ...... | 340/815.01 |
| 4,598,198 A | 7/1986 | Fayfield ..................... | 250/205 |

(List continued on next page.)

FOREIGN PATENT DOCUMENTS

| | | |
|---|---|---|
| DE | 43 04 216 A1 | 2/1993 |
| DE | 297 12 281 | 5/1997 |
| EP | 0 468 822 A2 | 7/1991 |
| EP | 0 531 184 A1 | 8/1992 |
| EP | 0 531 185 A1 | 8/1992 |
| EP | 0 596 782 A1 | 10/1992 |
| EP | 0 633 163 A1 | 7/1994 |
| EP | 0 709 818 A1 | 5/1996 |
| EP | 0 896 898 A2 | 7/1998 |
| FR | 2 658 024 | 2/1990 |
| FR | 2 680 861 | 9/1992 |
| FR | 2 707 222 | 7/1993 |
| GB | 2069257 | 8/1981 |
| GB | 2175428 A | 11/1986 |
| GB | 2 175 428 A | 11/1986 |
| GB | 2 330 679 A | 10/1988 |
| GB | 2240650 A | 8/1991 |
| GB | 2272791 A | 5/1994 |
| GB | 2292450 A | 2/1996 |
| GB | 2311401 A | 9/1997 |

*Primary Examiner*—Donnie L. Crosland
(74) *Attorney, Agent, or Firm*—Vidas, Arrett & Steinkraus

(57) ABSTRACT

A modular warning signal light system comprising at least one support. The at least one support having at least one module receiving port. The module receiving ports constructed and arranged to removably receive the support engagement member of a module. Each module having at least one visible side. The at least one visible side having at least one light emitting diode light source engaged thereto. The at least one light emitting diode light source, module and support all in independent electrical communication with a controller. The controller constructed and arranged to selectively activate the at least one support, the at least one module, the at least one light emitting diode light source, and any combinations thereof to create at least one warning light signal.

20 Claims, 19 Drawing Sheets

U.S. PATENT DOCUMENTS

| | | | | |
|---|---|---|---|---|
| 4,615,131 | A | 10/1986 | Wakatake | 40/473 |
| 4,616,225 | A | 10/1986 | Woudenberg | 340/908 |
| 4,630,180 | A | 12/1986 | Muraki et al. | 362/223 |
| 4,630,183 | A | 12/1986 | Fujita | 362/311 |
| 4,633,280 | A | 12/1986 | Takazu | 357/17 |
| 4,654,629 | A * | 3/1987 | Bezos et al. | 362/800 |
| 4,703,219 | A | 10/1987 | Mesquida | 313/111 |
| 4,716,296 | A | 12/1987 | Bussiere et al. | 250/504 |
| 4,720,835 | A | 1/1988 | Akita | 372/50 |
| 4,799,135 | A | 1/1989 | Inukai et al. | 362/296 |
| 4,918,497 | A | 4/1990 | Edmond | 357/17 |
| 4,929,866 | A | 5/1990 | Murata et al. | 313/500 |
| 4,935,665 | A | 6/1990 | Murata | 313/500 |
| 4,954,822 | A | 9/1990 | Borenstein | 340/925 |
| 4,965,644 | A | 10/1990 | Kawabata et al. | 357/17 |
| 4,966,862 | A | 10/1990 | Edmond | 437/100 |
| 4,990,970 | A | 2/1991 | Fuller | 357/17 |
| 5,027,168 | A | 6/1991 | Edmond | 357/17 |
| 5,045,767 | A | 9/1991 | Wakatake | 318/696 |
| 5,050,055 | A | 9/1991 | Lindsay et al. | 362/293 |
| D324,921 | S | 3/1992 | Stanuch et al. | D26/35 |
| 5,093,768 | A | 3/1992 | Ohe | 362/241 |
| 5,097,397 | A | 3/1992 | Stanuch et al. | 362/74 |
| 5,097,612 | A | 3/1992 | Williams | |
| 5,101,326 | A | 3/1992 | Roney | 362/61 |
| 5,122,943 | A | 6/1992 | Pugh | 362/256 |
| 5,136,287 | A | 8/1992 | Borenstein | 340/925 |
| 5,187,547 | A | 2/1993 | Niina et al. | 257/77 |
| 5,220,235 | A | 6/1993 | Wakimizu et al. | 313/25 |
| 5,224,773 | A | 7/1993 | Arimura | 362/227 |
| 5,233,204 | A | 8/1993 | Fletcher et al. | 257/13 |
| 5,235,498 | A | 8/1993 | Val Dulmen et al. | 362/296 |
| 5,283,425 | A | 2/1994 | Imamura | 250/208.1 |
| 5,313,187 | A | 5/1994 | Choi et al. | 340/331 |
| 5,321,593 | A | 6/1994 | Moates | 362/251 |
| 5,357,123 | A | 10/1994 | Sugawara | 257/88 |
| 5,357,409 | A | 10/1994 | Glatt | 362/105 |
| 5,359,255 | A | 10/1994 | Kawai et al. | 313/17 |
| 5,361,190 | A | 11/1994 | Roberts et al. | 362/61 |
| 5,362,971 | A | 11/1994 | McMahon et al. | 250/577 |
| 5,403,916 | A | 4/1995 | Watanabe et al. | 437/127 |
| 5,406,095 | A | 4/1995 | Koyama et al. | 257/88 |
| 5,410,328 | A * | 4/1995 | Yoksza | 345/82 |
| 5,419,065 | A | 5/1995 | Lin | 40/550 |
| 5,420,444 | A | 5/1995 | Sawase et al. | 257/99 |
| 5,422,623 | A | 6/1995 | Bader et al. | 340/331 |
| 5,450,301 | A * | 9/1995 | Waltz et al. | 340/815.45 |
| 5,475,241 | A | 12/1995 | Harrah et al. | 257/99 |
| 5,482,896 | A | 1/1996 | Tang | 437/209 |
| 5,490,049 | A | 2/1996 | Montalan et al. | 362/240 |
| 5,491,350 | A | 2/1996 | Unno et al. | 257/99 |
| 5,498,883 | A | 3/1996 | Lebby et al. | 257/95 |
| 5,514,627 | A | 5/1996 | Lowery et al. | 437/209 |
| 5,516,727 | A | 5/1996 | Broom | 437/211 |
| 5,519,720 | A | 5/1996 | Hirano et al. | 372/36 |
| 5,526,237 | A | 6/1996 | Devanport et al. | 362/32 |
| 5,528,474 | A | 6/1996 | Roney et al. | 362/249 |
| 5,567,036 | A | 10/1996 | Theobald et al. | 362/80 |
| 5,569,939 | A | 10/1996 | Choi | 257/94 |
| 5,575,459 | A | 11/1996 | Anderson | 362/240 |
| 5,580,156 | A | 12/1996 | Suzuki et al. | 362/184 |
| 5,585,783 | A | 12/1996 | Hall | 340/473 |
| 5,593,223 | A | 1/1997 | Koizumi | 362/255 |
| 5,612,231 | A | 3/1997 | Holm et al. | 437/23 |
| 5,625,201 | A | 4/1997 | Holm et al. | 257/88 |
| 5,627,851 | A | 5/1997 | Takahashi | 372/44 |
| 5,631,474 | A | 5/1997 | Saitoh | 257/88 |
| 5,632,551 | A | 5/1997 | Roney et al. | 362/249 |
| 5,634,711 | A | 6/1997 | Kennedy et al. | 362/119 |
| 5,636,916 | A | 6/1997 | Kokolowski | 362/61 |
| 5,656,829 | A | 8/1997 | Sakaguchi et al. | 257/94 |
| 5,661,645 | A * | 8/1997 | Hochstein | 363/89 |
| 5,661,742 | A | 8/1997 | Hunag et al. | 372/46 |
| 5,674,000 | A | 10/1997 | Kalley | 362/293 |
| 5,694,112 | A | 12/1997 | VannRox et al. | 340/472 |
| 5,697,175 | A | 12/1997 | Schwartz | 40/552 |
| 5,705,047 | A | 1/1998 | Lee | 205/123 |
| 5,707,891 | A | 1/1998 | Izumi et al. | 437/120 |
| 5,726,535 | A | 3/1998 | Yan | 362/800 |
| 5,739,552 | A | 4/1998 | Kimura et al. | 257/89 |
| 5,739,592 | A | 4/1998 | Rigsby et al. | 307/9.1 |
| 5,758,947 | A | 6/1998 | Glatt | 362/105 |
| 5,760,531 | A | 6/1998 | Pederson | 313/25 |
| 5,785,418 | A | 7/1998 | Hochstein | 362/373 |
| 5,789,768 | A | 8/1998 | Lee et al. | 257/96 |
| 5,793,062 | A | 8/1998 | Kish, Jr. et al. | 257/98 |
| 5,796,376 | A * | 8/1998 | Banks | 345/82 |
| 5,804,822 | A | 9/1998 | Brass et al. | 250/302 |
| 5,805,081 | A | 9/1998 | Fikacek | 340/908 |
| 5,806,965 | A | 9/1998 | Deese | 362/249 |
| 5,808,592 | A * | 9/1998 | Mizutani et al. | 362/800 |
| 5,838,024 | A | 11/1998 | Masuda et al. | 257/98 |
| 5,838,247 | A | 11/1998 | Bladowski | 340/815.45 |
| 5,848,837 | A | 12/1998 | Gustafson | 362/235 |
| 5,898,381 | A | 4/1999 | Gartner et al. | 340/815.65 |
| 5,900,850 | A | 5/1999 | Bailey et al. | 345/55 |
| 5,929,788 | A | 7/1999 | Vukosic | 340/908.1 |
| 5,931,562 | A | 8/1999 | Arato | 362/184 |
| 5,931,570 | A * | 8/1999 | Yamuro | 362/355 |
| 5,932,860 | A | 8/1999 | Plesko | 235/454 |
| 5,934,694 | A | 8/1999 | Schugt et al. | 280/33.991 |
| 5,939,996 | A * | 8/1999 | Kniveton et al. | 340/815.4 |
| 5,975,714 | A | 11/1999 | Vetorino et al. | 362/192 |
| 5,990,802 | A | 11/1999 | Maskeny | 340/815.45 |
| 6,009,650 | A | 1/2000 | Lamparter | 40/572 |
| 6,018,899 | A | 2/2000 | Hanitz | 40/473 |
| 6,028,694 | A | 2/2000 | Schmidt | 359/264 |
| 6,095,661 | A | 8/2000 | Lebens et al. | 362/184 |
| 6,102,696 | A | 8/2000 | Osterwalder et al. | 433/29 |
| 6,118,388 | A | 9/2000 | Morrison | 340/908 |
| 6,159,005 | A | 12/2000 | Herold et al. | 433/29 |
| 6,177,678 | B1 | 1/2001 | Brass et al. | 250/461.1 |
| 6,183,100 | B1 | 2/2001 | Suckow et al. | 362/35 |

* cited by examiner

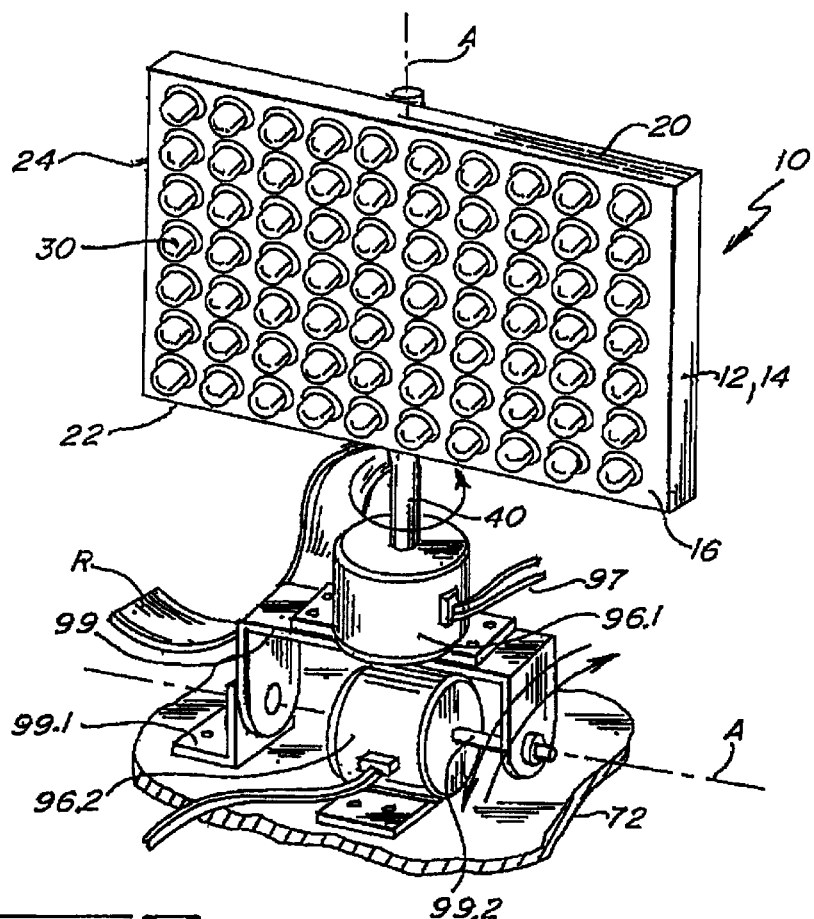
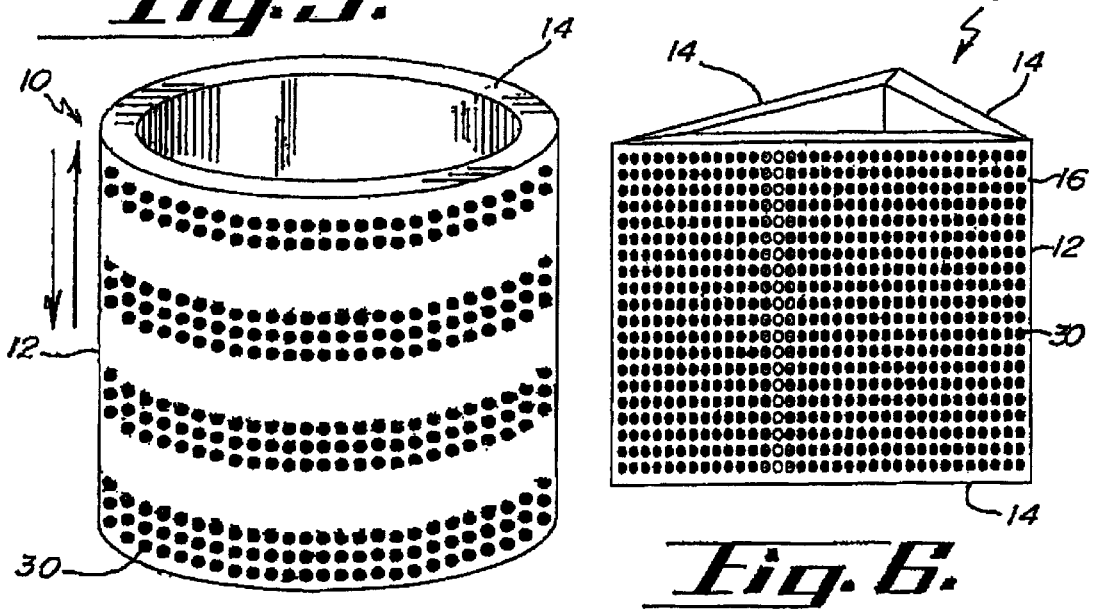

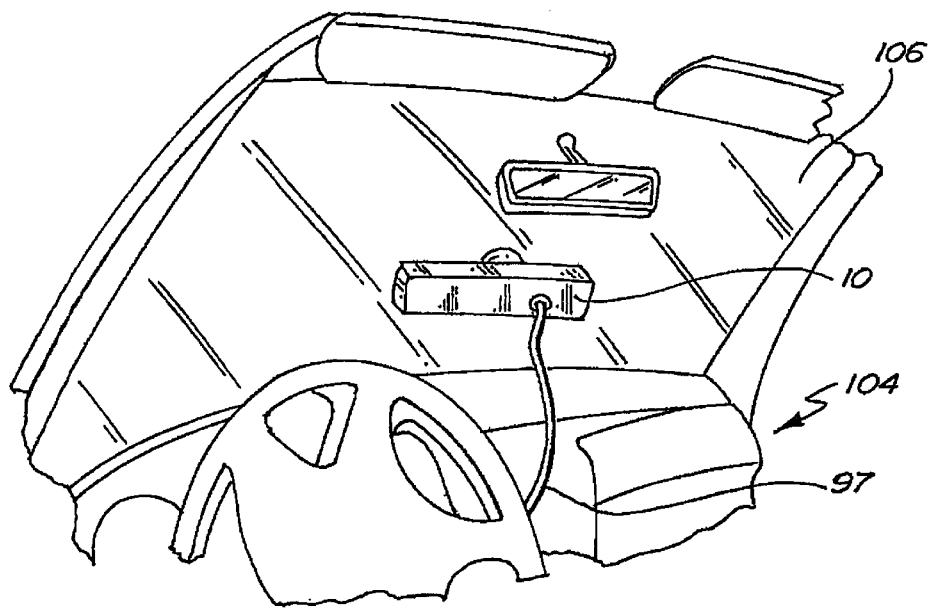
Fig. 13.
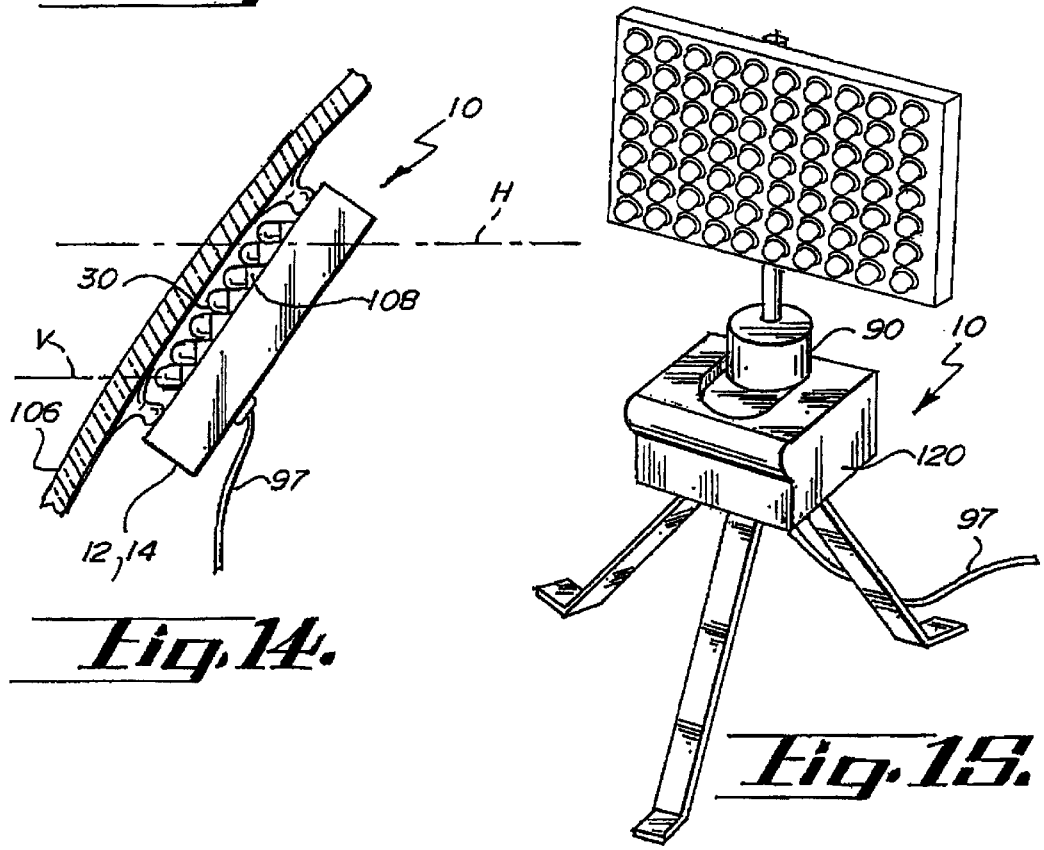
Fig. 14.
Fig. 15.

REPLACEABLE LED MODULES

CROSS-REFERENCE TO RELATED APPLICATIONS

The present invention is a continuation-in-part application claiming priority to U.S. patent application Ser. No. 09/539189 entitled REPLACEMENT LED LAMP ASSEMBLY AND MODULATED POWER INTENSITY FOR LIGHT SOURCE filed Mar. 30, 2000, now U.S. Pat. No. 6,380,865 which is based upon Provisional U.S. Patent Application No. 60/127,959, filed Apr. 6, 1999, both of which are incorporated herein by reference in their entirety.

STATEMENT REGARDING FEDERALLY SPONSORED RESEARCH

Not Applicable

BACKGROUND OF THE INVENTION

1. Field of the Invention

The present invention relates to a light emitting diode (LED) warning signal light having modulated power intensity for use by emergency vehicles. More particularly, the present invention is directed to a modular warning light signal system having interchangeable removable and replaceable LED modules.

2. Description of the Related Art

Light bars or emergency lights of the type used on emergency vehicles such as fire trucks, police cars, and ambulances, utilize warning signal lights to produce a variety of light signals. These light signals involve the use of various colors and patterns. Generally, these warning signal lights consist of revolving and oscillating lamps having reflective back support members and colored filters.

Many problems exist with the known methods for producing warning light signals. One particular problem with known light bars is their reliance on mechanical components to revolve or oscillate the lamps to produce the desired light signal. Additionally, these components increase the size of the light bar or emergency lights which may adversely affect the vehicles aerodynamic characteristics. Moreover, there is an increased likelihood that a breakdown of the light bar will occur requiring the repair or replacement of the defective component. Finally, the known light bars require a relatively large amount of electrical current during operation. The demands upon the electrical power system for a vehicle may therefore exceed available electrical resources reducing optimization of performance.

The most common light sources being used in light bars or emergency lights include halogen or incandescent lamps or gaseous discharge xenon lamps. These lamps emanate large amounts of heat which is difficult to dissipate from a sealed light bar or emergency light and which may damage the electronic circuitry contained therein. In addition, these lamps consume large amounts of current requiring a large power supply, battery, or electrical source which may not be available within a vehicle. These lamps also generate substantial electromagnetic emissions which may interfere with radio communications. Finally, these lamps, are generally not rugged, and which have a relatively short life cycle necessitating frequent replacement.

Another problem with the known warning signal lights is the use of filters to produce a desired color. Filtering techniques produce more heat that must be dissipated. Moreover, changing the color of a light source requires the physical removal of the filter from the light bar or emergency light and the insertion of a new filter. Furthermore, filters fade or flake rendering the filters unable to consistently produce a desired color for observation in an emergency situation.

The problems associated with traditional signaling lamps are exacerbated by the fact that creating multiple light signals requires multiple signaling lamps. Further, there is little flexibility in modifying the light signal created by a lamp. For example, changing a stationary lamp into one that rotates or oscillates would require a substantial modification to the light bar which may not be physically or economically possible.

The present invention relates to electrical lamps, and particularly the invention relates to high brightness light-emitting diode or "LED" technology which operate to replace gaseous discharge, halogen, or incandescent lamps as used as emergency warning light sources. The present invention is specifically directed to a modular system which includes one or more light supports onto which one or more LED cards or modules may be readily connected thereto. The LED module(s) and the light support(s) respectively may have a variety of shapes and sizes. Individual LED modules may be configured to provide specific lighting characteristics such as various color configurations. As a result, the LED modules may be arranged upon the light support(s) to provide a warning signal light which may be readily manipulated and reconfigured be adding modules, removing modules and re-arranging modules on various surfaces of the support(s) to establish a desired type of warning lighting effect.

Illumination lamps for automobile turn signals, brake lights, back-up lights, and/or marker lights/headlights frequently have accompanying utility parabolic lens/reflector enclosures which have been used for utility warning signals or emergency vehicle traffic signaling.

These signaling devices are commonly referred to as "unmarked corner tubes," or "dome tubes". These signaling devices frequently utilize xenon gaseous discharge tubes or incandescent lamps as the illumination sources.

A problem with the prior art is the cost and failure rate of the known "unmarked corner tubes," or "dome lights". The failure rate of these devices frequently results in significant amounts of "down time" for a vehicle to effectuate repair or replacement. Further, an officer is typically unaware that a vehicle light is inoperative requiring replacement. This condition reduces the safety to an officer during the performance of his or her duties. In addition, the reduced life cycle and failure rate of the known illumination devices significantly increases operational costs associated with material replacement and labor. A need, therefore, exists to enhance the durability, and to reduce the failure rate, of illumination devices while simultaneously reducing the cost of a replacement illumination source for a vehicle.

In the past, the xenon gaseous discharge lamps have utilized a sealed compartment, usually a gas tube, which may have been filled with a particular gas known to have good illuminating characteristics. One such gas used for this purpose was xenon gas, which provides illumination when it becomes ionized by the appropriate voltage application. Xenon gas discharge lamps are used in the automotive industry to provide high intensity lighting and are used on emergency vehicles to provide a visible flashing emergency signal light.

A xenon gas discharge lamp usually comprises a gas-filled tube which has an anode element at one end and a cathode element at the other end, with both ends of the tube sealed.

The anode and cathode elements each have an electrical conductor attached, which passes through the sealed gas end of the lamp exterior. An ionizing trigger wire is typically wound in a helical manner about the exterior of the glass tube, and this wire is connected to a high voltage power source typically on the order of 10–12 kilowatts (kw). The anode and cathode connections are connected to a lower level voltage source which is sufficient to maintain illumination of the lamp once the interior gas has been ionized by the high voltage source. The gas remains ignited until the anode/cathode voltage is removed; and once the gas ionization is stopped, the lamp may be ignited again by reapplying the anode/cathode voltage and reapplying the high voltage to the trigger wire via a voltage pulse.

Xenon gas lamps are frequently made from glass tubes which are formed into semicircular loops to increase the relative light intensity from the lamp while maintaining a relatively small form factor. These lamps generate extremely high heat intensity as well as light intensity, and therefore, require positioning of the lamps so as to not cause heat buildup in nearby components. The glass tube of a xenon lamp is usually mounted on a light-based pedestal which is sized to fit into an opening in the light fixture and to hold the heat generating tube surface in a light fixture compartment which is separated from other interior compartment surfaces. In a vehicle application, the light and base pedestal are typically sized to fit through an opening in the light fixture which is about 1 inch in diameter. The light fixture component may have a glass or plastic cover made from colored material so as to produce a colored lighting effect when the lamp is ignited. Xenon gas discharge lamps naturally produce white light, which may be modified to produce a colored light, of lesser intensity, by placing the xenon lamp in a fixture having a colored lens. The glass tube of the xenon lamp may also be painted or otherwise colored to produce a similar result, although the light illumination from the tube tends to dominate the coloring; and the light may actually have a colored tint appearance rather than a solid colored light. The color blue is particularly hard to produce in this manner.

Because a preferred use of xenon lamps is in connection with emergency vehicles, it is particularly important that the lamp be capable of producing intense coloring associated with emergency vehicles, i.e., red, blue, amber, green, and clear.

When xenon lamps are mounted in vehicles, some care must be taken to reduce the corroding effects of water and various chemicals, including road salt, which might contaminate the light fixture. Corrosive effects of moisture may destroy the trigger wire and the wire contacts leading to the anode and cathode. Corrosion is enhanced because of the high heat generating characteristics of the lamp which may significantly increase the temperature of the air inside the lamp fixture when the lamp is in use, and this heated air may condense when the lamp is off to buildup moisture inside the fixture. The buildup of moisture may result in the shorting out of the electrical wires and degrade the performance of the emission wire, sometimes preventing proper ionization of the gas within the xenon gas discharge lamp.

Warning lights, due to the type of light source utilized, may be relatively large in size which in turn may have adverse affects upon adjacent operational components. In addition, there is an increased likelihood for a breakdown requiring repair or replacement of enlarged components.

The known warning signal lamps generally emanate large amounts of heat which is difficult to dissipate from the sealed light bar or emergency light area and may damage the electronic circuitry contained therein.

Another problem with the known warning signal lights is the use of rotational and/or oscillating mechanisms which are utilized to impart a rotational or oscillating movement to a light source for observation during emergency situations. These mechanical devices are frequently cumbersome and difficult to incorporate and couple into various locations about a vehicle due to the size of the device. These mechanical devices also frequently require a relatively large power supply to operate the device to impart rotational and/or oscillating movement for a light source. Power consumption of electrical components for an emergency vehicle is of primary consideration for vehicle operators.

Another problem with the known warning signal lights is the absence of variable intensity for the light sources which increases the number of available distinct and independent visual light effects. In certain situations it may be desirable to provide a variable intensity light signal or a modulated intensity for a light signal to create a unique light effect to facilitate observation by an individual. In addition, the provision of a variable or modulated intensity for a light signal may further enhance the creation of a unique desired light effect for observation by an individual.

Another problem with the known warning signal lights is the inability to readily add, remove or otherwise manipulate and interchange the individual light sources within the warning signal light. It has typically been the case in prior warning signal lights that an individual light source could only be manipulated to the extent that a single light source was replaced with another individual light source. In the present invention, each LED module may have one or more individual LED light sources. The LED modules may have a wide variety of shapes and sizes. A given LED module may be replaced with any other LED module as desired by an individual. For example, an LED module having a cylindrical shape and a single LED mounted thereon may be interchanged with a planar module having several LEDs on one or more faces of the module. Additionally, the present invention may include one or more supports having a plurality of connection surfaces for receiving a like number of modules. Alternatively, each LED module may include one or more colors of LED light sources for the provision of a warning light signal.

No warning lights are known which are flexible and which utilize a variable light intensity to modify a standard lighting effect. The warning lights as known are generally limited to a flashing light signal. Alternatively, other warning signal lights may provide a sequential illumination of light sources. No warning or utility light signals are known which simultaneously provide for modulated and/or variable power intensity for a known type of light signal to create a unique and desirable type of lighting effect.

No warning signal lights are known which provide an irregular or random light intensity to a warning signal light to provide a desired type of lighting effect. Also, no warning light signals are known which provide a regular pattern of variable or modulated light intensity for a warning signal light to create a desired type of lighting effect. Further, no warning light signals known which combine a type of light effect with either irregular variable light intensity or regular modulated light intensity to provide a unique and desired combination lighting effect.

In addition, no warning light signals are known which have modular light sources that may be added, removed or interchanged upon a light support with other, different or similar, light source modules.

It may also be necessary to provide alternative colored LED light sources which may be electrically controlled for the provision of any desired pattern of light signals such as flashing, oscillating, modulating, rotational, alternating, and/or strobe light effects without the necessity of spatially inefficient and bulky mechanical rotational devices. A need exists to provide a spatially and electrically efficient LED light source for use on an emergency or utility vehicle which provides the appearance of rotation without the necessity of a mechanical rotational device. In addition, a need exists to provide a spatially and electrically efficient LED light source for use on an emergency vehicle which provides a flashing, modulated, oscillating, rotational, alternating, and/or strobe light effects without the necessity of mechanical devices.

In view of the above, there is a need for a warning signal light that:

(1) Is capable of producing multiple light signals;
(2) Produces the appearance of a revolving or oscillating light signal without relying upon mechanical components;
(3) Generates little heat;
(4) Uses substantially less electrical current;
(5) Produces significantly reduced amounts of electromagnetic emissions;
(6) Is rugged and has a long life cycle;
(7) Produces a truer light output color without the use of filters;
(8) Reduces current draw upon an emergency vehicle power supply;
(9) Is positionable at a variety of locations about an emergency vehicle;
(10) Provides variable power intensity to the light source without adversely affecting the vehicle operator's ability to observe objects while seated within the interior of the vehicle; and
(11) Has a modular construction allowing a variety of light source modules to be readily manipulated and interchanged one or more light supports.

BRIEF SUMMARY OF THE INVENTION

According to the invention, there is provided a modular light emitting diode (LED) warning signal light which may be depicted in several embodiments. In general, the warning signal light may be formed of a modular array of light source modules configured on one or more light supports and in electrical communication with a controller and a power supply, battery, or other electrical source. AT least one embodiment of the warning signal light may provide various colored light signals for use by an emergency vehicle, with individual light modules being capable of removal or addition thereby providing different lighting configurations. These light signals may include a stationary light, a strobe light, a revolving light, a flashing light, a modulated or variable intensity light, an oscillating light, an alternating light, and/or any combination thereof. Additionally, at least one embodiment of the warning signal light may be capable of displaying symbols, characters, or arrows. Preferably, rotating and oscillating light signals are produced by sequentially illuminating columns of LED's on a stationary light support. However, the warning signal light or portions thereof may also be rotated or oscillated via mechanical means. The warning signal light may also be transportable for easy connection to a stand such as a tripod for electrical connection to a power supply, battery, or other electrical source as a remote stand-alone signaling device.

Individual LED modules, may extend from a standard support and mounting base. A support may include one or a plurality of LED lamp modules which may have one or a plurality of individual LEDs having one or more colors as desired by an individual. Additionally, rotating and oscillating light signals may be produced by substitution of an LED light source in an oscillating or reflective light assembly or by selective illumination of stationary LED's to simulate the appearance of the warning light source. In addition, the warning signal light and/or replacement warning signal light may be electrically coupled to a controller used to modulate the power intensity for the light sources to provide for various patterns of illumination to create an illusion of rotation or other type of illusion for the warning signal light without the use of mechanical devices for rotation and/or oscillation motion.

In at least one embodiment it is necessary to provide alternative colored LED light sources which may be electrically controlled for the provision of any desired pattern of light signals such as flashing, oscillating, modulating, rotational, alternating, and/or strobe light effects without the necessity of spatially inefficient and bulky mechanical rotational devices. In this regard, a need exists to provide a spatially and electrically efficient LED light source for use on an emergency vehicle which provides a desired appearance without the necessity of a mechanical device.

In at least one embodiment of the invention the reflective light assembly may be stationary. The reflective light assembly may also rotate about a stationary light source. In another alternative embodiment, individual LED modules may be positioned at a variety of angles relative to a light support. The individual LED modules may include one or more reflectors which may be rotated about a pivot point and axis to create the appearance of rotation for each light source or multiple light sources collectively. The light source may be utilized in conjunction with the reflective assembly and may also be electrically coupled to a controller for the provision of pulsating, variable, and/or modulated light intensity for observation by an individual.

In at least one embodiment of the invention, the controller is preferably in electrical communication with the power supply, the light support, the LED modules and individual LED's to modulate the power intensity for the LED light sources for variable illumination of the LED light sources to provide for the appearance of rotation, pulsation, oscillation, strobe, flashing, alternating, and/or stationary light without the necessity for mechanical devices.

An advantage of at least one embodiment of the present invention is to provide a warning signal light capable of simulating a revolving or oscillating light signal without the use of mechanical components.

Another advantage at least one embodiment of the present invention is that the warning signal light is capable of producing several different types of light signals.

Still another advantage of at least one embodiment of the present invention is that LED modules may easily be switched out and replaced without requiring removal or servicing of the entire warning signal light.

Still another advantage of at least one embodiment of the present invention is the selective arrangement and distribution of a variety of LED modules on a light support which will provide the warning signal light with a wide range of warning light configurations and also provide a variety of display options.

Still another advantage of at least one embodiment of the present invention is to be rugged and have a relatively longer life cycle than traditional warning signal lights.

Still another advantage of at least one embodiment of the present invention is to produce a truer or pure light output color without the use of filters.

Still another advantage of at least one embodiment of the present invention is to allow the user to adjust the color of the light signal without having to make a physical adjustment from a multi-colored panel.

Still another advantage of at least one embodiment of the present invention is that it may be formed into various shapes. This allows the invention to be customized for the particular need.

Still another advantage of at least one embodiment of the present invention is that the light signal produced may be easily customized by the user via a controller or microprocessor.

Still another principal advantage of at least one embodiment of the present invention is the provision of an LED light source which is formed of a relatively simple and inexpensive design, construction, and operation and which fulfills the intended purpose without fear of failure or injury to persons and/or damage to property.

Still another principal advantage of at least one embodiment of the present invention is the provision of an LED light source which is flexible and which may easily replace existing illumination devices used as light bars, light sticks, turn signals, brake lights, back-up lights, marker lights, and headlights in utility lens/reflector enclosures.

Still another principal advantage of at least one embodiment of the present invention is the provision of an LED light source for creation of bright bursts of intense colored light to enhance the visibility and safety of a vehicle in an emergency signaling situation.

Still another principal advantage of at least one embodiment of the present invention is the provision of an LED light source which is flexible and may easily replace existing illumination devices at a much more economic expense and further having a reduced failure rate.

Still another principal advantage of at least one embodiment of the present invention is the provision of an LED light source which produces brilliant lighting in any of the colors associated with an emergency vehicle light signal such as red, blue, amber, green, and/or white.

Still another principal advantage of at least one embodiment of the present invention is the provision of an LED light source which is highly resistant to corrosive effects and which is impervious to moisture build-up.

Still another principal advantage of at least one embodiment of the present invention is the provision of an LED light source which has an extended life cycle and continues to operate at maximum efficiency throughout its life cycle.

Still another principal advantage of at least one embodiment of the present invention is the provision of an LED light source which draws less current and/or has a reduced power requirement from a power source for a vehicle.

Still another principal advantage of at least one embodiment of the present invention is the provision of an LED light source having improved reliability as compared to xenon gaseous discharge lamps and/or incandescent lamps as currently used on emergency vehicles.

Still another principal advantage of at least one embodiment of the present invention is the provision of an LED light source which is simple and may facilitate the ease of installation and replacement of a xenon and/or incandescent light source from a motor vehicle.

Still another principal advantage of at least one embodiment of the present invention is the provision of an LED light source which reduces RF emissions which may interfere with other radio and electronic equipment in an emergency vehicle.

Still another principal advantage of at least one embodiment of the present invention is the provision of an LED light source which functions under cooler operating temperatures and conditions thereby minimizing the exposure of heat to adjacent component parts which, in turn, reduces damage caused by excessive heat.

Still another principal advantage of at least one embodiment of the present invention is the provision of an LED light source having simplified circuitry for operation as compared to xenon gaseous discharge lamps and/or incandescent lamps as used with an emergency vehicle.

Still another principal advantage of at least one embodiment of the present invention is the provision of an LED light source which is flexible and which may be connected to a modulated power source to vary the power intensity for the LED's to provide the appearance of rotation and/or oscillation without the use of mechanical rotational or oscillating devices.

Still another principal advantage of at least one embodiment of the present invention is the provision of a warning signal light which may be easily visualized during emergency situations thereby enhancing the safety of emergency personnel.

Still another principal advantage of at least one embodiment of the present invention is the provision of a warning signal light which includes LED technology and which is operated by a controller to provide any desired type or color of light signal including but not limited to rotational, pulsating, oscillating, strobe, flashing, alternating, and/or stationary lights without the necessity for mechanical devices.

Still another principal advantage of at least one embodiment of the present invention is the provision of a warning signal light which is capable of simultaneously producing several different types of light signals.

At least one embodiment of the invention includes a plurality of light emitting diodes (LED's), integral to a circuit board which acts as an LED module, the LED's may be arranged in a variety of configurations on the various surfaces of the module. Modules may then be removably received onto any of a variety of module receiving ports located on one or more surfaces of a light support. The receiving ports provide an electrical connection between the modules and LEDs, the light support and the controller.

In at least one embodiment of the invention an LED module may include a mechanical device which rotates or oscillates the LEDs thereon during use. Alternatively, the light support or a portion thereof may include such a rotational and/or oscillating mechanical device having one or more module receiving ports permitting one or all of the modules to be rotated or oscillated, or otherwise placed in motion relative to the light support.

Yet another embodiment of the invention is the provision of modules and/or light support(s) which may be manipulated into any desired configuration or shape and which may be used as a stationary, rotating, or oscillating warning signal lights by an emergency vehicle.

Yet another embodiment of the invention is the provision of a module supporting an array of multi-colored LED's and a controller capable of selectively illuminating the LED's of the same color to produce a single or mixed colored light signal.

Still another embodiment of the invention is the provision of a light emitting diode module having an array of LED's disposed about a support consisting of at least two sides. The controller capable of producing light signals on each side which may be independent of each other.

Still another embodiment of the invention is the provision of an LED module having at least one array of LED's angularly offset with respect to a surface of the LED module for the provision of a horizontal light signal as viewed by an individual.

Still another embodiment of the invention is the provision of a light support which may be easily connectable and/or removed from a transportable support such as a tripod for placement of an LED warning signal light at any location as desired by an individual.

Still another embodiment of the invention is the provision of an LED warning signal light which may be easily connectable to an emergency vehicle, including but not limited to automobiles, ambulances, trucks, motorcycles, snowmobiles, and/or any other type of vehicle in which warning signal or emergency lights are utilized.

Still another embodiment of the present invention is the provision a microprocessor/controller which is in electrical communication with the LED light support(s), connected modules and their respective LEDs to selectively activate individual modules and or individual LED's to produce a variety of lighting effects such as: flashing, strobe, alternating, rotating, oscillating, pulsating, stationary light signals and any combinations thereof.

Still another embodiment of the present invention is the provision of a light support having one or more LED's modules thereon where the individual LEDs are of the same or different colors for use as a light signal.

Still another embodiment of the present invention is the provision the controller capable of selectively activating individual LED's and/or entire LED modules of the same or different colors to produce a single or mixed colored light signal(s).

Still another embodiment of the present invention is the provision of a warning signal light having a controller in electrical communication with a plurality of arrays of LED warning signal lights or single light sources located on one or more LED modules and having a modulated power intensity to create a variety of lighting effects which include rotational motion, oscillating motion, pulsation and any combinations thereof without the necessity for mechanical devices.

Still another embodiment of the present invention is the provision of an LED light source where the power may be modulated by the controller to produce variable power intensity for the light sources to provide various desired patterns of illumination.

The present invention may also include other advantages, features and embodiments which are not explicitly stated herein.

BRIEF DESCRIPTION OF THE SEVERAL VIEWS OF THE DRAWINGS

A detailed description of the invention is hereafter described with specific reference being made to the drawings in which:

FIG. 3 is a perspective view of a warning signal light attached to a gyrator according to an embodiment of the invention;

FIG. 5 is a perspective view of a warning signal light according to an embodiment of the invention depicting sequential activation of rows of LED's;

FIG. 6 is a perspective view of a warning light signal according to an embodiment of the invention;

FIG. 13 is a perspective detailed view of a warning signal light attached to the interior of a windshield of an emergency vehicle;

FIG. 14 is a side plan view of a warning signal light mounted to an interior surface of an emergency vehicle window having auxiliary offset individual LED light sources;

FIG. 15 is an environmental view of a warning signal light as engaged to a remote support device such as a tripod;

DETAILED DESCRIPTION OF THE INVENTION

Figure 1:
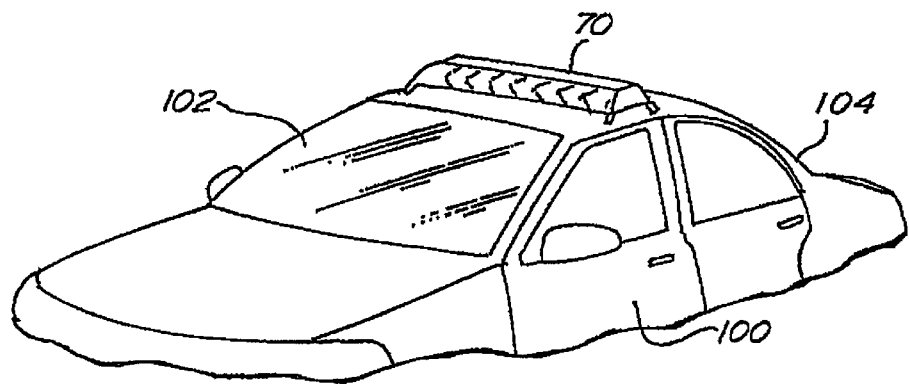
FIG. 1 is a partial perspective view of an emergency vehicle equipped with a light bar containing warning signal lights according to an embodiment of the invention.
Figure 2:
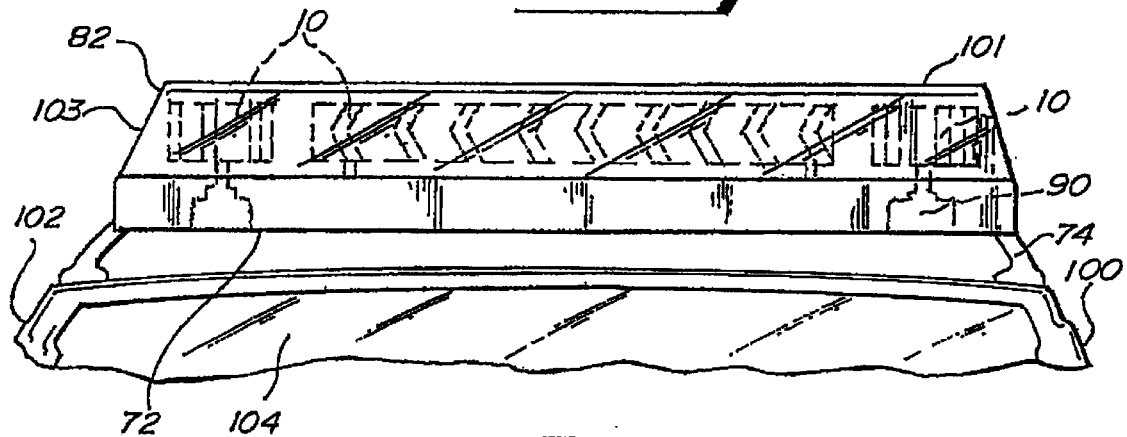
FIG. 2 is a partial front elevation view of an emergency vehicle equipped with a light bar containing warning signal lights referring to an embodiment of the invention.
Figure 4:
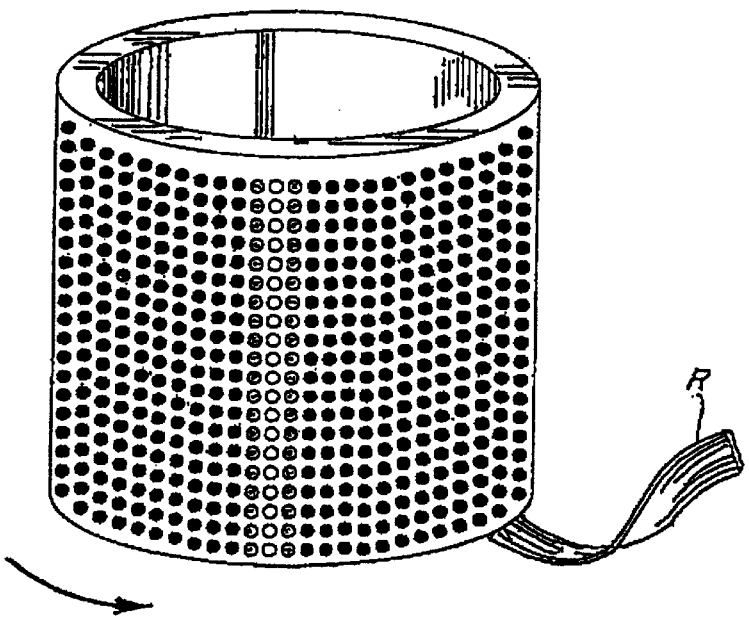
FIG. 4 is a perspective view of a warning signal light according to an embodiment of the invention depicting the sequential activation of columns of light-emitting diodes (LED's)

A warning signal light according to the principles of the invention is indicated generally herein as numeral 10. FIGS. 1 and 2 depict light bar 70 mounted to an emergency vehicle 104. Light bar 70 includes base 72, mounting means 74, cover 82, and warning signal lights 10. Also included in light bar 70 are gyrators 90 used to impart motion to warning signal lights 10.

Figure 9:
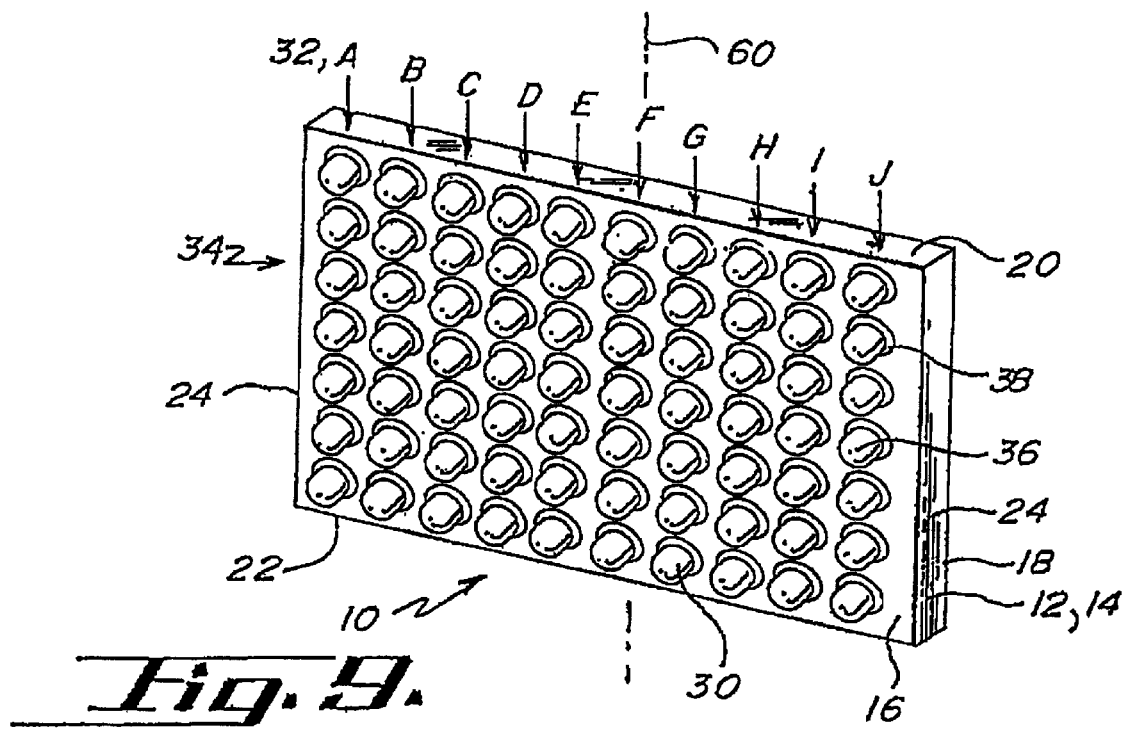
FIG. 9 is a perspective view of a warning light signal according to an embodiment of the invention.

Referring to FIGS. 3 and 9, warning signal light 10 comprises light support 12, light sources 30, controller 50 (shown in FIG. 11), and connecting portion 40 for attaching the warning signal light 10 to light bar 70 or gyrator 90. The warning signal light 10 operates to create a warning signal for use by an emergency vehicle 104 by selectively activating light sources 30 using controller 50. Alternatively, warning signal light 10 may be formed of a solitary LED light source 30 at the discretion of an individual.

Figure 7:
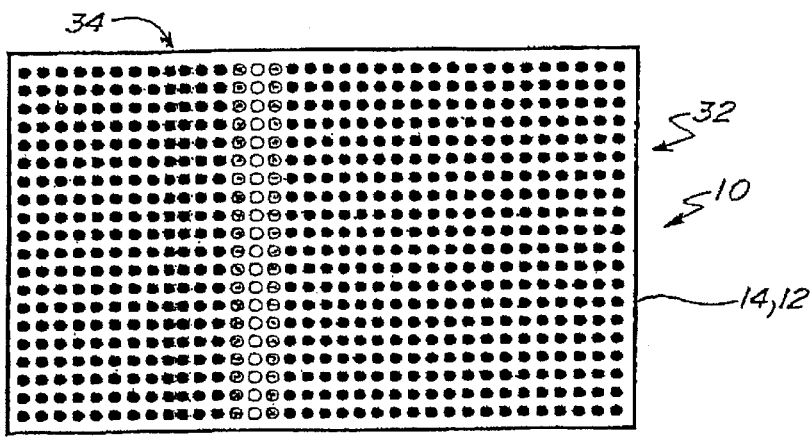
FIG. 7 is a perspective view of a warning light signal according to an embodiment of the invention.

Light sources 30 are preferably light emitting diodes (LED's) and are generally arranged in aligned columns 32 and rows 34 as shown in FIGS. 7 and 9. Each of the light emitting diodes (LED's) may have shoulder portion 38 adjacent LED support 12 and dome 36. LED's 30 are situated to be in electric communication with controller 50 and a power supply, a battery, or power source. The use of light emitting diodes (LED's) to replace traditional halogen, incandescent, or gaseous discharge xenon lamps reduces heat generation, current draw, and electromagnetic emissions, while increasing lamp life and producing a more true output light color.

The controller 50 is used to selectively activate columns 32, rows 34, or individual LED's 30, to illuminate any number of a plurality of visually distinct types of warning light signals at any moment; to illuminate more than one of a plurality of visually distinct types of warning light signals simultaneously at any moment; to illuminate one of a plurality of combinations or patterns of visually distinct warning light signals at any moment, or over any desired period of time, or to illuminate more than one of a plurality of combinations or patterns of visually distinct warning light signals over any desired period of time. The plurality of visually distinct warning light signals may include, but are not necessarily limited to, a strobe light signal, a pulsating light signal, an alternating light, a modulated light signal, a flashing light signal, the illusion of a rotating or an oscillating light signal, a reverse character message, or images such as arrows. It should be noted that the controller 50 may also incorporate into any selected warning light signal variable or modulated power intensity to facilitate the provision of a desired unique lighting effect. For example, the controller 50 may illuminate one or more LED light sources 30 to establish a single warning light signal at a given moment. Alternatively, the controller 50 may illuminate one or more light emitting diode light sources 30 to provide two or more warning light signals at any given moment. Further, the controller 50 may simultaneously, consecutively, or alternatively, illuminate one or more LED light sources 30 to establish any desired combination or pattern of illuminated visually distinct warning light signals at any given moment or over a desired period of time. The combination and/or pattern of visually distinct warning light signals may be random or may be cycled as desired by an individual. The illumination of one or more patterns or combinations of warning light signals facilitates the continued observation by an individual. Occasionally, the concentration or attention of an individual is diminished when exposed to a repetitive or to a monotonous light signal. The desired purpose for illumination of a warning light signal is thereby reduced. The provision of a pattern, combination, and/or random illumination of visually distinct warning light signals maximizes the concentration or attention to be received from an individual observing a warning light signal. The purpose of the warning light signal is thereby promoted.

Figure 11A:
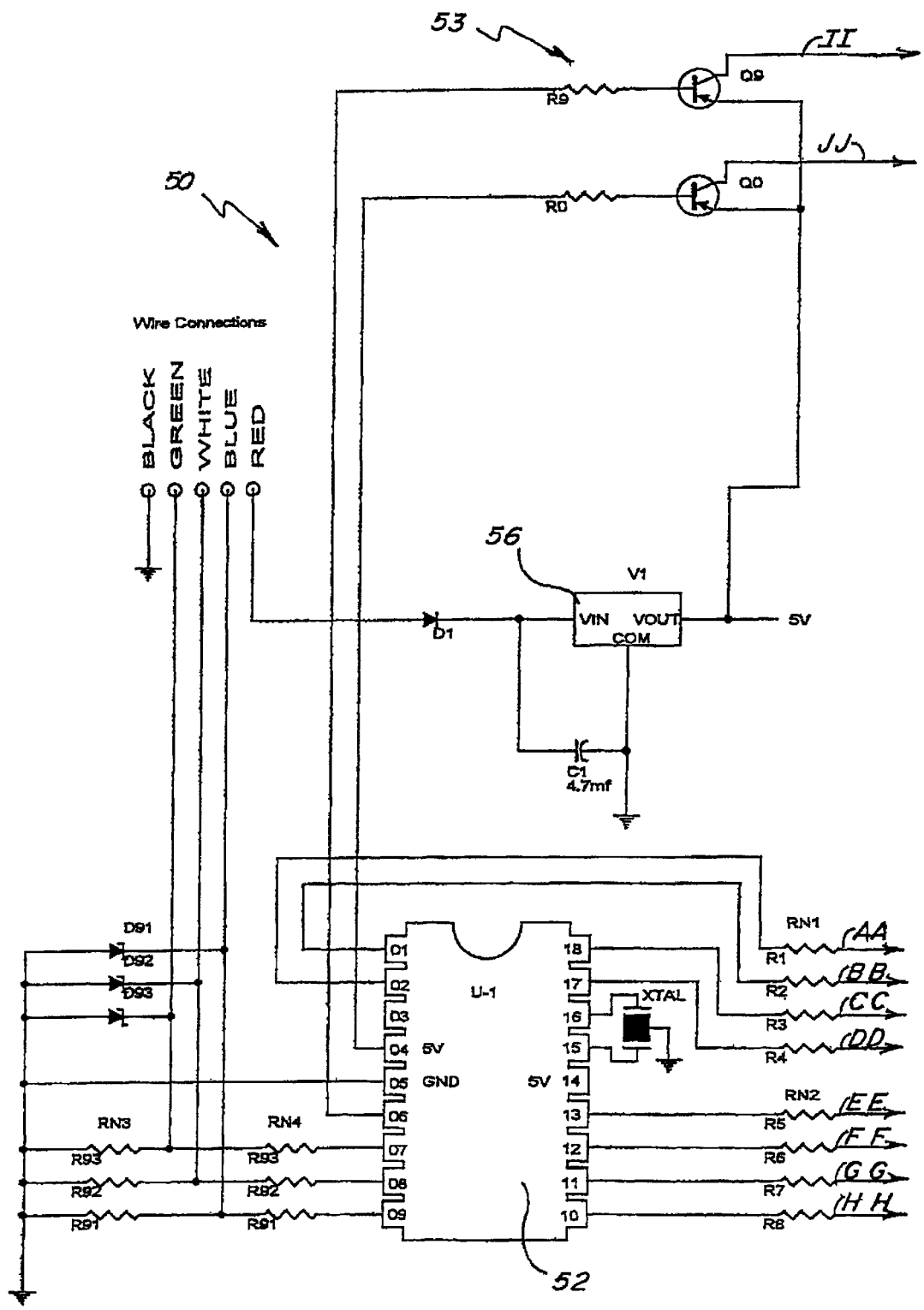
FIGS. 11A, 11B, and 11C are schematic diagrams of the controller circuitry in accordance with an embodiment of the invention.
Figure 11B:
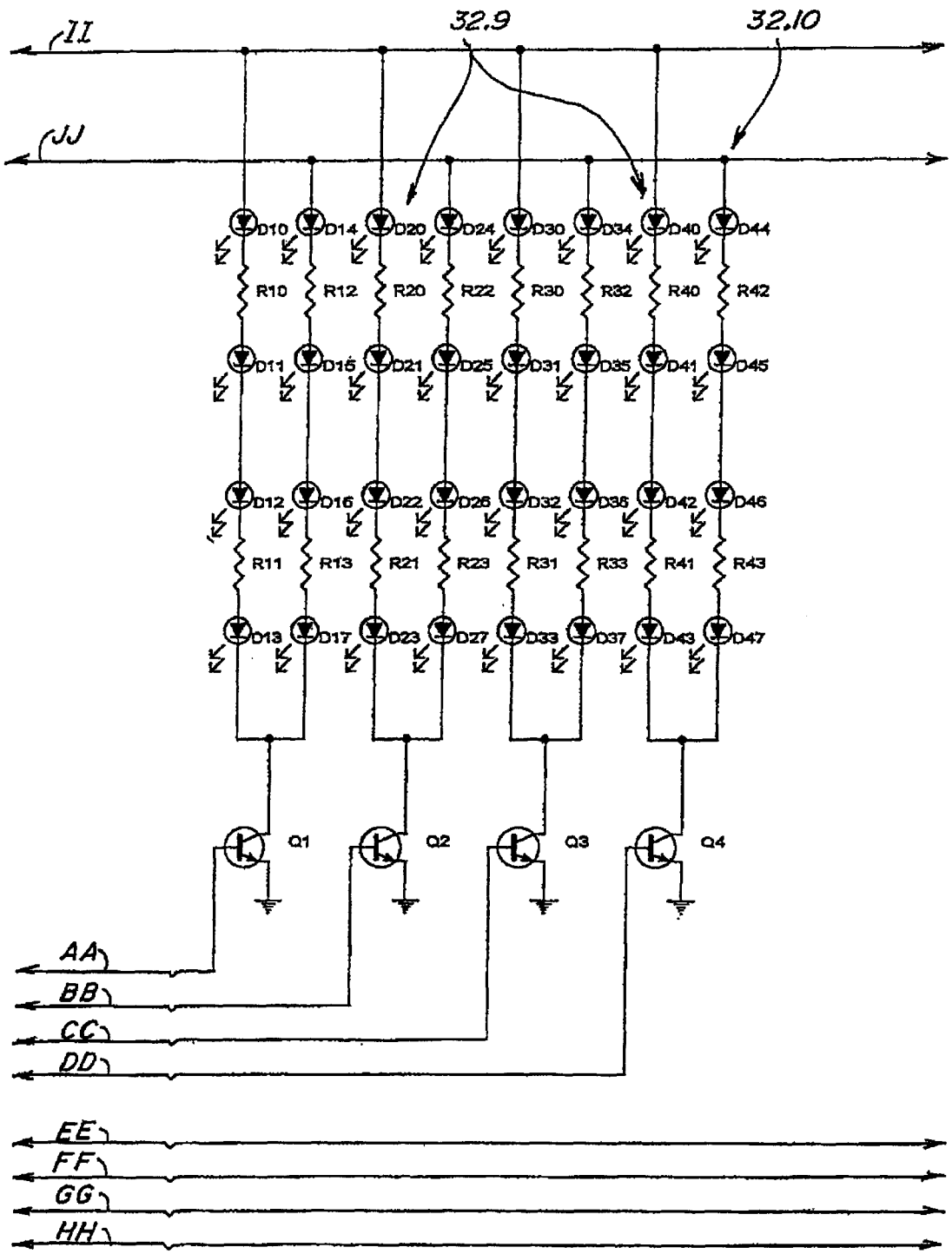
Figure 11C:
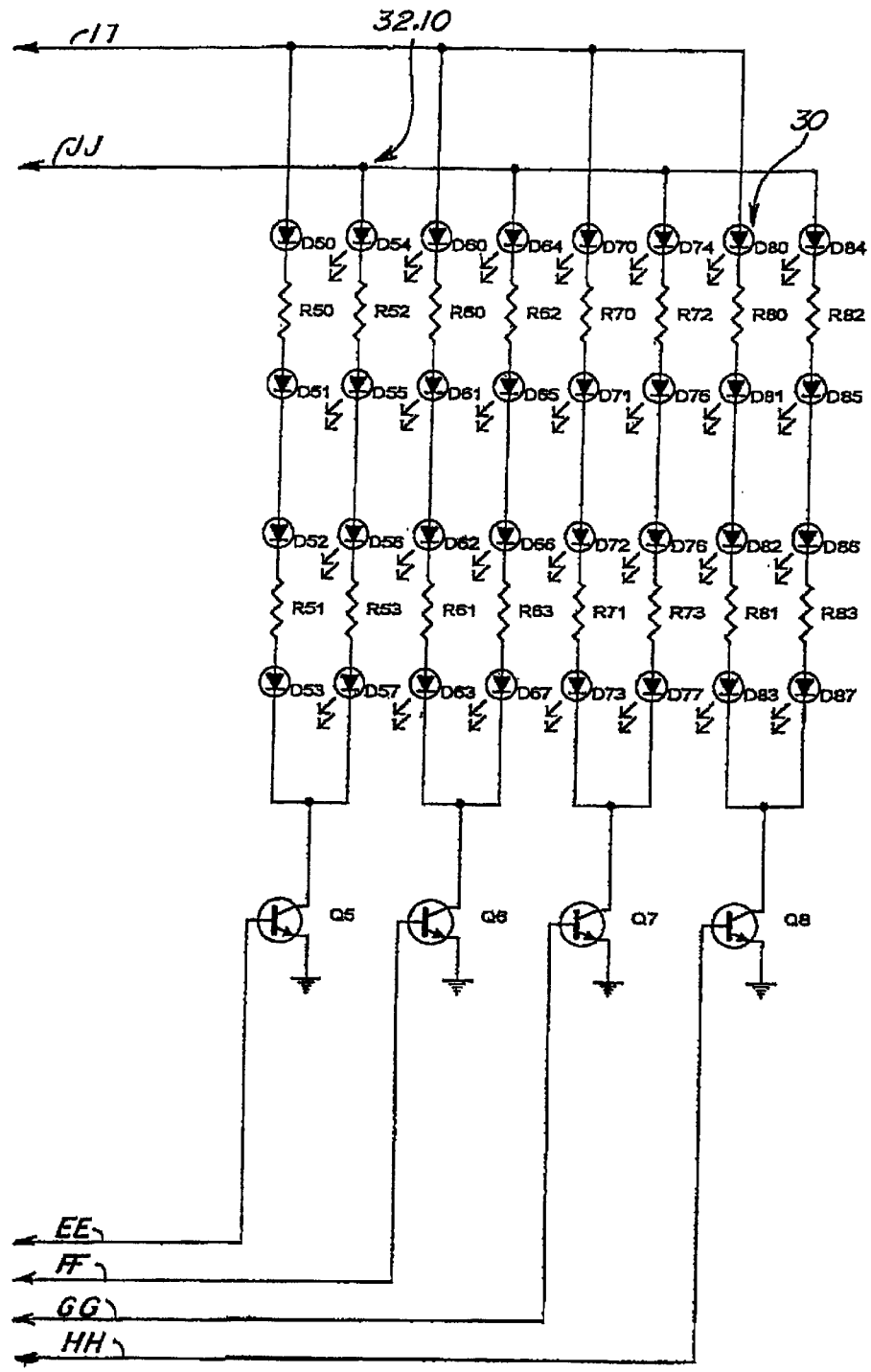

FIGS. 11A, 11B, and 11C show an embodiment of controller 50 capable of selectively activating columns 32, rows 34 or individual LED's 30. Controller 50 generally comprises microprocessor 52 and circuitry 53 and is preferably contained within, attached to, or an element of, LED support 12. It is envisioned that controller 50 may be programmed by an external controller 55 and powered through cable R.

In one embodiment, controller 50 generally comprises circuit board 54 or LED mounting surface having microprocessor 52 attached to a low voltage power supply, battery, or electrical source 56. Microprocessor 52 is configured through circuitry 53 to selectively activate columns 32 of LED's 30. Transistors Q9 and Q10 are in electronic communication with microprocessor 52, power supply, battery, or electrical source 56, and their respective columns 32.9 and 32.10 of LED's 30. Columns 32 of LED's 30 are connected to transistors Q1–Q8, which are in turn connected to microprocessor 52 through resistors R1–R8. Microprocessor 52 is capable of selectively activating transistors Q1–Q8 to allow current flowing through transistors Q9 and Q-10 to activate the selected column 32 of LED's 30. This circuit is capable of producing a strobe light signal, an alternating light signal, a modulated signal, a revolving light signal, a pulsating light signal, an oscillating light signal, or flashing light signal, a reverse character message, or images such as arrows.

In one embodiment, a rotating or oscillating light signal may be established by the sequential illumination of entire columns 32 of LED's 30 by turning a desired number of columns on and then sequentially illuminating one additional column 32 while turning another column 32 off. Alternatively, the rotating or oscillating warning light signal may be created by selectively activating columns 32 of LED's 30. The following algorithm may be used to provide a counterclockwise revolving light signal (FIG. 9):

1) column A is activated at 0% duty cycle (column A 0%), column B 0%, column C 0%, column D 0%, column E 0%, column F 0%, column G 0%, column H 0%, column I 0%, and column J 0%;
2) column A 25%, column B 0%, column C 0%, column D 0%, column E 0%, column F 0%, column G 0%, column H 0%, column I 0%, and column J 0%;
3) column A 50%, column B 25%, column C 0%, column D 0%, column E 0%, column F 0%, column G 0%, column H 0%, column I 0%, and column J 0%;
4) column A 75%, column B 50%, column C 25%, column D 0%, column E 0%, column F 0%, column G 0%, column H 0%, column I 0%, and column J 0%;
5) column A 100%, column B 75%, column C 50%, column D 25%, column E 0%, column F 0%, column G 0%, column H 0%, column I 0%, and column J 0%;
6) column A 100%, column B 100%, column C 75%, column D 50%, column E 25% column, column F 0%, column G 0%, column H 0%, column I 0%, and column J 0%;
7) column A 75%, column B 100%, column C 100%, column D 75%, column E 50%, F 25%, column G 0%, column H 0%, column I 0%, and column J 0%;
8) column A 50%, column B 75%, column C 100%, column D 100%, column E 75%, column F 50%, column G 25%, column H 0%, column I 0%, and column J 0%;
9) column A 25%, column B 50%, column C 75%, column D 100%, column E 100%, column F 75%, column G 50%, column H 25%, column I 0%, and column J 0%;
10) column A 0%, column B 25%, column C 50%, column D 75%, column E 100%, column F 100%, column G 75%, column H 50%, column I 25%, and column J 0%;
11) column A 0%, column B 0%, column C 25%, column D 50%, column E 75%, column F 100%, column G 100%, column H 75%, column I 50%, and column J 25%;
12) column A 0%, column B 0%, column C 0%, column D 25%, column E 50%, column F 75%, column G 100%, column H 100%, column I 75%, and column J 50%;
13) column A 0%, column B 0%, column C 0%, column D 0%, column E 25%, column F 50%, column G 75%, column H 100%, column 1100%, and column J 75%;
14) column A 0%, column B 0%, column C 0%, column D 0%, column E 0%, column F 25%, column G 50%, column H 75%, column I 100%, and column J 100%;
15) column A 0%, column B 0%, column C 0%, column D 0%, column E 0%, column F 0%, column G 25%, column H 50%, column I 75%, and column J 100%;
16) column A 0%, column B 0%, column C 0%, column D 0%, column E 0%, column F 0%, column G 0%, column H 25%, column I 50%, and column J 75%;
17) column A 0%, column B 0%, column C 0%, column D 0%, column E 0%, column F 0%, column G 0%, column H 0%, column I 25%, and column J 50%;
18) column A 0%, column B 0%, column C 0%, column D 0%, column E 0%, column F 0%, column G 0%, column H 0%, column I 0%, and column J 25%;
19) column A 0%, column B 0%, column C 0%, column D 0%, column E 0% column F 0%, column G 0%, column H 0%, column I 0%, and column J 0%;
20) return to step 1).

A clockwise revolving light signal may be created by performing steps 1–19 in descending order then repeating the steps. An oscillating light signal may be created by performing: (a) steps 7 through 16 in ascending order; (b) steps 7 through 16 in descending order; and (c) repeating (a) and (b).

A second embodiment of controller 50 provides a means for activating LED's 30 individually to allow for greater flexibility in the type of warning light signal created. This embodiment of the invention is capable of displaying information in different colors or patterns. Depending on the size of the display, it may be necessary to scroll the symbols or characters across the display to accommodate for a larger visual appearance. It is envisioned that the mirror image of patterns, symbols, or characters could be displayed making the message easily readable by drivers viewing the signal in a rear view mirror. It is also envisioned that this embodiment of the invention could display arrows indicating a direction a vehicle is to travel or other images as shown in FIG. 2. In addition, combinations of warning signal lights, direction arrows, and other information carrying signals or images, could be displayed simultaneously by the invention.

LED support 12 is envisioned to have several embodiments. One embodiment, shown in FIG. 9, consists of a panel 14 having front 16, back 18, top 20, bottom 22 and sides 24. LED's 30 are arranged on front 16, with domes 36 extending therefrom, in columns 32 and rows 34. LED's 30 are in electric communication with controller 50 which may be contained or sealed within LED support 12 to provide protection from the elements.

Figure 10:
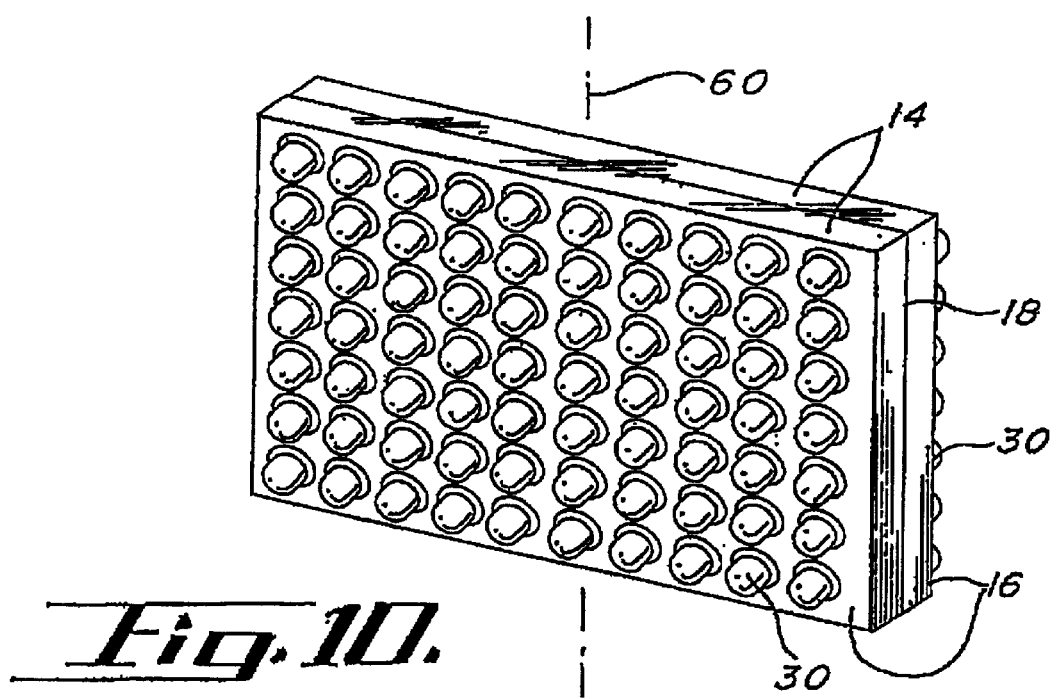
FIG. 10 is a perspective view of a warning light signal according to an embodiment of the invention.

Another embodiment of warning signal light 10 is depicted in FIG. 10. Here, the backs 18 of two panels 14 are attached together to allow for a light signal to be produced on two sides. The two panels 14 form LED support 12. Alternatively, it is envisioned that a single panel 14 having LED's arranged about front 16 and back 18 could be used as well.

Figure 8:
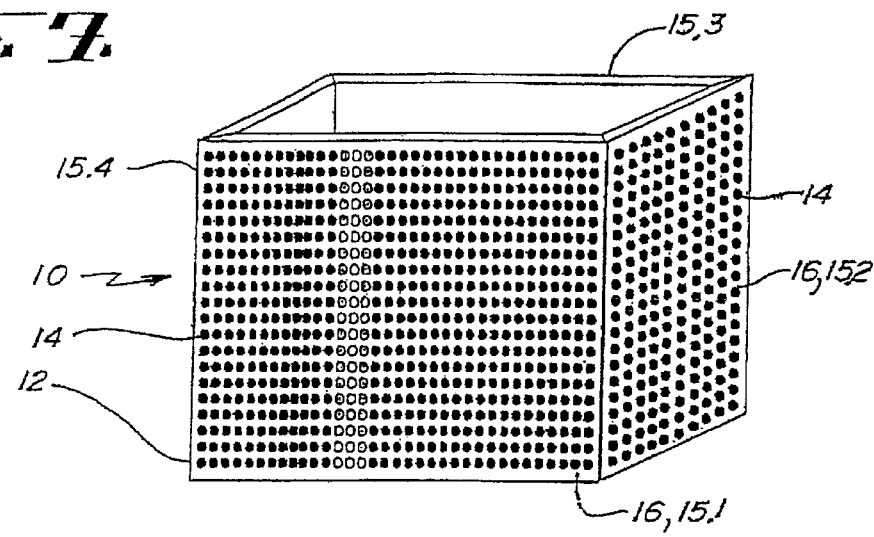
FIG. 8 is a perspective view of a warning light signal according to an embodiment of the invention.

FIGS. 6 and 8 show further embodiments of warning signal light 10. In FIG. 8, panels 14 are used to form an LED support 12 having four sides and generally shaped as squared. FIG. 6 shows panels 14 connected to form an LED support 12 having three sides and generally triangular in shape. In both embodiments, LED's 30 are arranged about the fronts 16 of the panels 14. It is further envisioned that panels 14 may be integral to each other.

Figure 12:
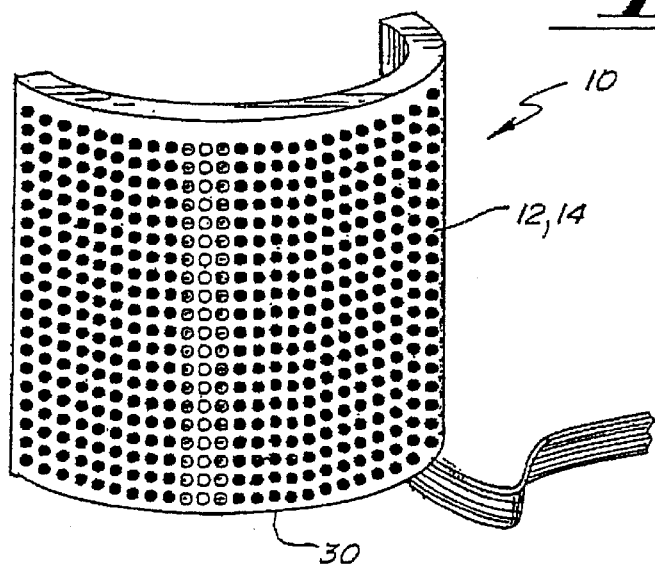
FIG. 12 is a perspective view of a warning signal light according to an embodiment of the invention.

Yet another embodiment of warning signal light 10, consists of a flexible panel 14 and controller 50 to allow LED support 12 to be formed into various shapes. FIG. 5 shows LED support 12 formed into a cylinder. Further variations include the use of flexible panels 14 to form other shapes such as semicircles (FIG. 12) or to simply conform to a surface of an emergency vehicle (FIGS. 13 and 14). This embodiment is particularly useful for undercover vehicles which generally position the warning signal lights inside the vehicle. For example, panel 14 could be attached to the front, rear, or side window of an undercover police vehicle.

It should be noted that numerous other shapes could be formed from panels 14 including those formed from combinations of flat, curved, and flexible panels at the preference of an individual.

In each of the embodiments discussed above, the array of LED's 30 may be formed of the same or differently colored LED's. Generally, each column 32 or row 34 may consist of a series of differently colored LED's. Controller 50 may be configured to select the color of the LED's to be illuminated forming the light signal. Accordingly, the user may select a blue, red, white, yellow, green, or amber color or any combination thereof to be used as the color of light signal. Alternatively, the warning signal 10 may be formed of individual LED's 30 which may be selectively illuminated at the discretion of an individual.

It is also envisioned that the controller 50 may control warning signal lights 10 having multiple sides (FIGS. 5, 6, 8, and 10) such that each side is capable of producing warning light signals or combination warning light signals that are independent and/or different from those produced upon the other sides. For example, the squared shape warning signal light shown in FIG. 8 may produce or simulate a red revolving light on first side 15.1, while second side 15.2 is simultaneously producing a blue oscillating light, while third side 15.3 is producing or simulating a stationary white light, and while fourth side 15.4 is producing a white strobe light.

Another embodiment of warning signal light 10 is depicted in FIGS. 1 and 2 as light bar 70 which extends from driver side 100 to passenger side 102 of emergency vehicle 104. Cover 82 protects light bar 70 from the elements. Each side of light bar 70 may have LED's 30 to produce or simulate warning light signals on each side of emergency vehicle 104. Furthermore, controller 50 may be used to create multiple warning light signals on each side of light bar 70. For example, controller 50 may create a simulated revolving blue light positioned at front passenger side 102 of light bar 70, oscillating white lights positioned at front driver side 100, and yellow arrows there between. Additional or alternative warning light signals may be produced out the back 18 and sides of light bar 70. It is further envisioned that light bar 70 may consist of a single light source 30, a single row of light sources 30 or a large array of light sources 30 across each side (not shown). This embodiment provides the largest display and, therefore, is best suited to display desired combinations of warning lights and images. It should be noted that the identified types of warning light signals, combinations and/or patterns of warning light signals, may also be reproduced through the illumination of a single row of LED light sources 30.

Mechanical rotation and oscillation of warning signal lights 10 about axis A is possible by way of attachment to gyrator 90 depicted in FIG. 3. Gyrator 90 mounted to light bar 70, generally comprises electric motors 96 having cables 97. Gyrator 90 is configured to receive connecting portion 40 of warning signal light 10. Cable 97 is preferably connected to a power supply and either an external controller 55 or controller 50.

Gyrator 90 may be capable of rotating or oscillating warning signal light about a single or dual axis of rotation A. FIG. 3 shows gyrator 90 configured to rotate or oscillate warning signal light 10 about a vertical axis A by way of motor 96.1 and oscillate warning signal light 10 about a horizontal axis A by way of motor 96.2. Rotation or oscillation of warning signal light 10 about vertical axis A is accomplished through direct attachment of connecting portion to motor 96.1. Oscillation of warning signal light 10 about horizontal axis A is accomplished by attaching swivel arm 99 to bracket 99.1 and post 99.2 which is mounted to motor 96.2.

Alternative methods for imparting rotation or oscillation motion to warning signal light 10 may be accomplished through the use of electric motors, toothed gears, and worm gears. In addition, maintaining electrical communication between a power supply and an external controller 55 with a revolving or oscillating warning signal light 10 may be accomplished using brushes or other means without sacrificing the operation of the warning signal light 10.

In another embodiment as depicted in FIGS. 13 and 14, emergency vehicle 104 may include a front or rear windshield 106. The front or rear windshield 106 is generally angularly offset with respect to the vehicle at an approximate angle of 45 degrees. In this embodiment, the mounting of a panel 14 of light sources 30 in flush contact with the interior of a front or rear windshield 106 occurs through the use of angular offsets 108 for the light sources 30 such that light emitted from the light sources occur at a horizontal visual line (V) which is substantially parallel to the plane of a vehicle and not at an approximate angle of 45 degrees upward, which corresponds to the angle for the front or rear windshield 106.

In this embodiment, the ease of visualization of the light source 30 is significantly enhanced by the downward angular offsets 108 which position the light sources 30 along parallel visual lines of sight (V). LED supports 12 or panels 14 may then be positioned in any desired location within the interior of a vehicle in flush contact or proximate to the front or rear windshield 106. A suitable cable 97 is required to provide electrical power for illumination of the light sources 30. It should be noted that the angle of incidence for the angular offsets 108 may vary considerably dependent upon the make or model for the vehicle to include the warning signal lights 10.

It should be further noted that the warning signal light 10 may be used with an automobile, motorcycle, snowmobile, personal water craft, boat, truck, fire vehicle, helicopter, and/or any other type of vehicle receptive to the use of warning signal lights 10. It should be further noted that LED support 12 or panel 14 may be mounted to the interior top dashboard of a vehicle proximate to the front windshield 106 or to the interior top rear dashboard proximate to the rear windshield 106 of a vehicle.

Mounting of a light support 12 or panel 14 to either the front or rear dashboards may minimize the necessity for inclusion of angular offset 108 for the light sources 30. It should be further noted that LED supports 12 or panels 14 may be releasably affixed to the interior of the front or rear windshields 106 via the use of suction cups, hook-and-loop fabric material such as Velcro®, and/or any other releasable affixation mechanism at the preference of an individual. An individual may then adjust and reposition the location of the light support 12 or panels 14 anywhere within the interior of a vehicle as desired for maximization of visualization of the warning signal lights 10.

In another alternative embodiment as depicted in FIG. 15, warning signal light 10 may function as a remote, revolving, or stationary beacon. In this embodiment, LED support 12 or panel 14 is preferably releasably connected to a transportable support 120 via the use of a bracket. The transportable support 120 may be a tripod having telescoping legs or may be any other type of support as preferred by an individual. In this embodiment, LED light support 12 or panel 14 is electrically connected to an elongate electrical extension cable 97 which may include any desired adapter for electrical connection to a power source which may be a vehicle. The remote light support 12 or panel 14 may also include plug-in adapters for electrical connection to any desired electrical power source other than a vehicle as is available.

The transportable support 120 may also include gyrator 90 as earlier described to provide a desired rotational or oscillatory motion for warning signal light 10. A controller 50 having a microprocessor 52 may also be integral to, or in electrical communication with, LED's 30 for the provision of multi-colored lights, flashing, alternating, modulated, moving characters, arrows, stroboscopic, oscillating and/or revolving warning light signals as desired by an individual. In this embodiment, the warning signal light 10 may be physically separated from an emergency vehicle 104 any desired distance to facilitate or enhance the safety of a potentially dangerous situation necessitating the use of warning signal lights 10. In addition, it should be noted that a series of remote warning signal lights 10 may be electrically coupled to each other for any desired distance to again facilitate the safety of a situation necessitating the use of warning signal lights 10.

Figure 16:
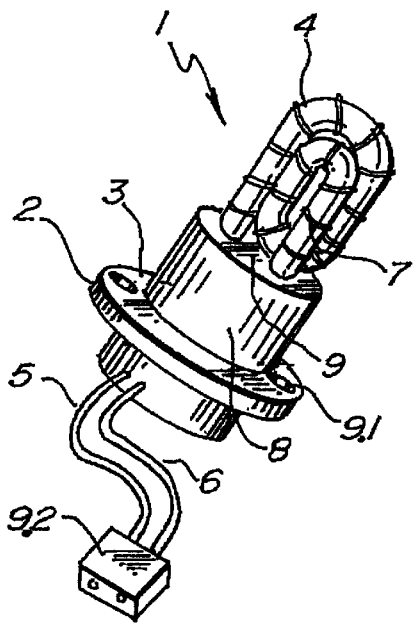
FIG. 16 is a detailed isometric view of a xenon strobe tube and standard mounting base.

FIG. 16 shows a perspective view of a xenon lamp 1. Xenon lamp 1 has a base pedestal 2 which is typically formed of rubber, plastic, or other insulating material. Base pedestal 2 has a top surface 3 which may support a glass tube 4 which may have a looped curve such that an anode end and a cathode end are each supported on a top surface. The anode and cathode ends may be sealed and respective electrical conductors 5 and 6 may pass through the sealed ends and through the top surface 3. A trigger wire 7 may be helically wound about the exterior surface of the glass tube 4 and the ends of the trigger wire 7 may be passed through the top surface 3 of the base pedestal 2 to form a third conductor on the underside of the base pedestal 2.

Base pedestal 2 may have an upper cylinder portion 8 extending from a lower shoulder all of which may extend above the top surface 3. The upper cylindrical portion 8 may include an upper shoulder 9. A glass dome (not shown) may be sized to fit over the xenon lamp 1 and glass tube 4 for resting on the upper shoulder 9. The glass dome may be preferably made from a transparent or silicate glass material capable of withstanding heat stress. The outer diameter of the glass dome is typically about one inch which is sized to fit through the conventional opening in a typical vehicle lamp fixture. The exterior glass dome surface typically has a much lower temperature during operation than the exterior surface of the glass tube 4 forming a part of the xenon lamp 1. The temperature drop between the glass tube 4 and the glass dome facilitates the use of coloring of the dome to provide a colored lamp by virtue of the xenon light intensity passing through the colored dome.

Figure 20:
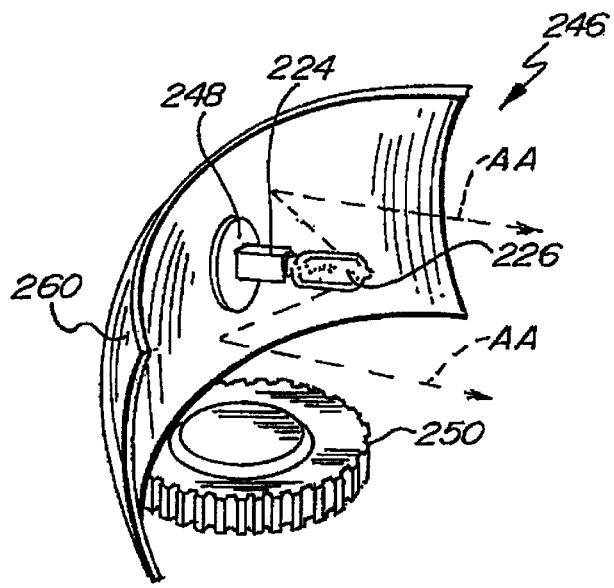
FIG. 20 is a front view of a standard halogen light source mounted in a rotating reflector.
Figure 21:
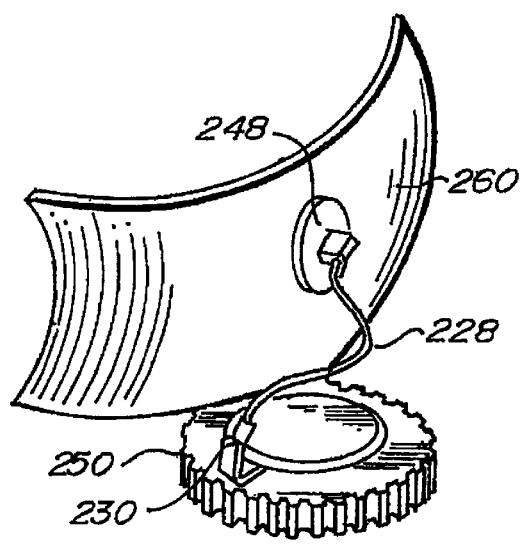
FIG. 21 is a detailed rear view of a rotating reflector mechanism.

The xenon lamp 1 is preferably aligned for insertion into a conventional opening 248 of a light reflector 260 (FIGS. 20 and 21). The light receptacle opening 248 in the light reflector 260 is typically about one inch in diameter; and the glass dome and base pedestal 2 are preferably sized to fit within the light receptacle opening 248. The xenon lamp 1 in its final construction may include a cover plate (not shown) affixed over the bottom opening of the base pedestal 2 for affixation to a light reflector 260 via the use of screws which pass through the screw apertures 9.1. The anode, cathode, and trigger wire 7 preferably traverse the base pedestal 2 and may include a plug 9.2 which is adapted for engagement to a controller/power supply for a motor vehicle.

The light reflector 260 may be a conventional light reflector of the type found in vehicles having a clear plastic or glass lens cover. The glass or lens cover may be fitted over the front edge of the reflector 260 in a manner which is conventional with vehicle lamps. It should be noted that the light reflector 260 may be parabolically or other shaped at the preference of an individual. The light reflector 260 may be mounted to a motor for rotation about a vertical axis. In this embodiment the light source/replacement lamp 200 may be integrally connected or affixed to the reflector 260 for simultaneous rotation about the vertical axis during use of the motor. Alternatively, the light source/replacement lamp 200 may be fixed proximate to the vertical axis where the light reflector 260 is rotated around the stationary replacement lamp 200 to provide for the visual appearance of a rotational light source.

The glass domes as used with the xenon lamps 1 may be colored with any color as preferred by an individual including but not limited to red, blue, amber, green, and/or white. It should be noted that the light fixture incorporating the light reflector 260 may be a headlight fixture or a turn signal light fixture where the xenon lamp 1 is mounted into the light reflector 260 on either side of a centrally-mounted halogen light bulb which may be used as a headlight lamp. In this case, the light fixture could perform its normal function as a headlight and could alternatively flash several additional colors, depending upon the needs of the user. This configuration provides an emergency flashing light construction which is wholly concealed within a normal head lamp of a vehicle and is, therefore, not readily visible from outside the vehicle unless the lights are flashing. This construction may find application in an unmarked emergency vehicles such as might be used by some law enforcement officers.

In operation, the LED replacement lamp 200 may be constructed as a replacement part for a conventional incandescent or xenon gaseous discharge lamp. The standard mounting base 204 and LED support assembly 212 may be sized to readily fit into the same light opening as an incandescent lamp would require, although it is apparent the electrical driving circuit for the LED replacement lamp 200 may require modifications to accommodate the LED operating principles.

LED warning signal lamp 200 may be used in a variety of locations about a vehicle. It should be noted that the use of the LED warning signal lamps 200 are not necessarily limited to positioning adjacent to the head lamp or headlight, tail light, or turn signal illumination devices for an emergency vehicle 104. The LED warning signal lamp 200 may be used as a rotational, pulsating, or oscillating reflector light within the interior adjacent to a front, rear, and/or side window of a vehicle.

It is also envisioned that the controller 50 may control warning signal lights 200 independently of one another such that each warning signal lamp 200 is capable of producing warning light signals which are independent and/or different from those produced at another location about an emergency vehicle 104. For example, a front left location may produce a red colored light while simultaneously a front right location may produce an amber colored light and a right rear location may produce a green colored light and a left rear location may produce a blue colored light. The controller 50 may then alternate the color of the light illuminated from the warning signal lamp 200 in each area as desired by an individual. Alternatively, the controller 50 may sequentially activate warning signal lamps 200 positioned about an emergency vehicle 104 to simultaneously produce a desired color or alternating sequence of colors. It should also be noted that the controller 50 may simultaneously illuminate all LED warning signal lamps 200 to produce a flashing or strobe light which may be particularly useful in certain emergency situations. It should be further noted that the controller 50 may selectively illuminate individual LED warning signal lamps 200 in any desired color, pattern, and/or combination as desired by an individual.

Figure 17:
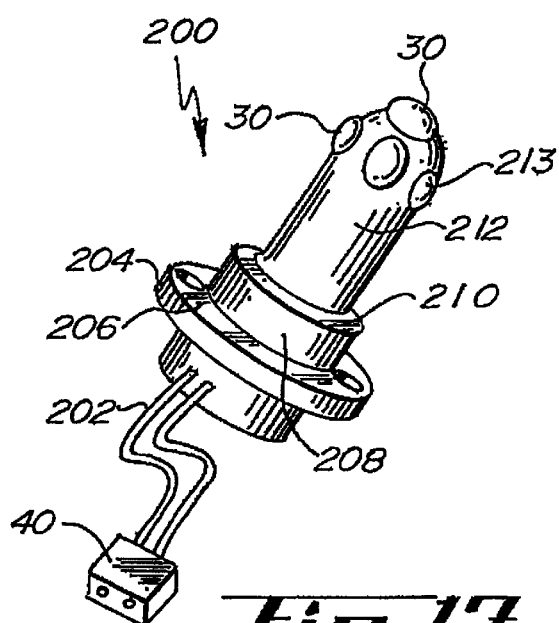
FIG. 17 is a detailed isometric view of the replacement LED light source and standard mounting base.

Referring to FIG. 17 in detail, an LED replacement lamp 200 is depicted. In this embodiment the LED replacement lamp 200 includes a standard mounting base 204 which preferably includes a top surface 206. Extending upwardly from the top surface 206 is preferably an upper cylindrical portion 208 which includes an upper shoulder 210. Extending upwardly from the upper shoulder 210 is preferably an LED support assembly 212 which includes one or more LED lamp modules 213. The LED lamp modules 213 may be of the same or different colors at the discretion of an individual. A wire 202 is preferably in electrical communication with the plurality of LED lamp modules 213 to provide for electrical communication with the controller 50 to individually activate or illuminate LED lamp modules 213 as preferred by an individual. A plug-in connector 40 is preferably coupled to the wire 202 for engagement to the controller 50 and/or power source of an emergency vehicle 104.

The LED replacement lamp 200 is preferably adapted to be positioned in a one inch light receptacle opening 248 (approximate size) which has been previously placed through the backside of a reflector assembly 260. The LED replacement lamp 200 is preferably used to replace a xenon gaseous discharge lamp or incandescent lamp as previously mounted to a base which is inserted into opening 248 in a reflector assembly 260. Illumination of one or more individual LED lamp modules 213, as mounted in the reflector assembly 260, enables the reflector assembly/lens to take on the appearance of a warning signal or emergency signaling lamp. The LED replacement lamp 200 preferably replaces the xenon gaseous discharge or incandescent lamp assemblies with high brightness, long life LED technology.

Figure 18:
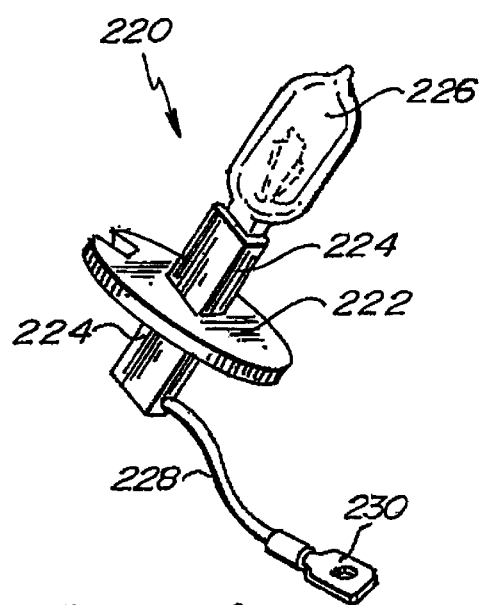
FIG. 18 is a detailed isometric view of an incandescent lamp light source and standard mounting base.

Referring to FIG. 18, an incandescent lamp or quartz halogen H-2 lamp is depicted and in general is indicated by the numeral 220. The incandescent lamp assembly 220 is preferably formed of a standard mounting base 222. A vertical post 224 preferably extends upwardly from the standard mounting base 222. The incandescent light bulb 226 is preferably mounted in the vertical post 224. The vertical post 224 may extend below the standard mounting base 222 to provide for electrical coupling with a wire 228 which preferably includes a standard pin connector 230. The standard pin connector 230 is preferably adapted for electrical communication to a power supply and/or controller 50 for activation of the incandescent lamp assembly 220. The incandescent lamp assembly 220 may be stationary or mounted in a rotational light reflector 260 as desired by an individual. The light bulb 226 may be a halogen H-2, 55 watt, lamp at the discretion of an individual.

Figure 19:
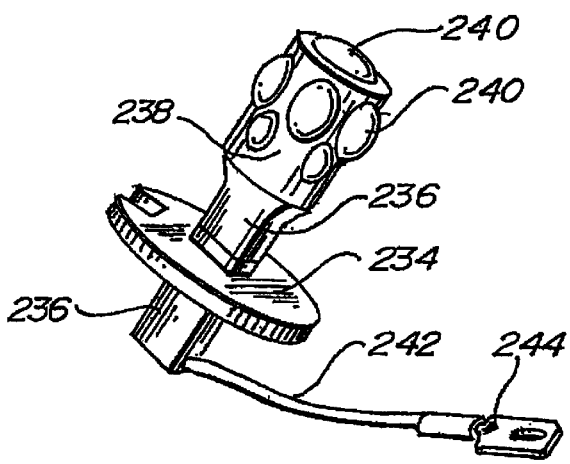
FIG. 19 is a detailed isometric view of a replacement LED lamp and standard mounting base.

As depicted in FIG. 19, LED replacement lamp 200 is adapted to replace the incandescent lamp assembly 220 in a stationary or rotational light reflector 260. The LED replacement lamp 200 as depicted in FIG. 19 preferably includes a standard mounting base 234 and a vertical post 236. It should be noted that the vertical post 236 may extend upwardly from the standard mounting base 234 and may alternatively extend below the standard mounting base 234 at the preference of an individual. An LED mounting area 238 may be preferably integral or affixed to the upper section of the vertical post 236. The LED mounting area 238 preferably includes a plurality of individual LED module lamps 240 which may be individually, sequentially, or illuminated in combination with other light sources at the preference of an individual.

The individual LED module lamps 240 are preferably in electrical communication with a wire 242 which includes an integral standard wire connector 244. The wire connector 244 is preferably adapted to be plugged into a controller 50 or power supply. Communication is thereby provided for selective illumination of the individual LED module lamps 240. It should be noted that a group of individual LED module lamps 240 are mounted in the LED mounting area 238. It should also be noted that the LED replacement lamp 200 is preferably adapted to replace the incandescent lamp assembly 220 or a xenon gaseous discharge lamp assembly base of FIGS. 16 or 18. The purpose of the LED replacement lamp assembly 200 is to replace existing xenon gaseous discharge and incandescent lamps with new LED technology while simultaneously utilizing existing standard bases in a standard lamp enclosure. For example, an individual may choose to replace a halogen "H-2" 55 watt lamp with an "LED-2" lamp in an existing rotating light fixture with no other structural modifications, yet achieving the advantages of less power consumption, greater reliability, easier installation, less RF emissions (which reduces interference with radio or electronic equipment), cooler operating temperatures, simplified circuitry, longer life, greater durability and duty capability, and simultaneously providing pure and easier-to-see color light output.

As depicted in FIG. 20, a rotational light reflector 246 is disclosed. The rotational light fixture 246 includes a reflector assembly 260 having a standard opening 248. The incandescent light assembly 220 is preferably positioned in the standard opening 248 for extension of the vertical post 224 outwardly from the reflector assembly 260 for positioning of the light source 30 in a desired location. Where the light source 30 is a standard halogen light bulb 226, the light emitted from the standard halogen light bulb 226 preferably reflects off the parabolic-shaped reflector assembly 260 for transmission of light in a direction as indicated by arrows AA for visualization by individuals. Reflector assembly 260 and bulb 226 may be rotated via the use of gears 250 which are preferably driven by electrical motors not shown. In this manner, the rotational light fixture 246 including the reflector assembly 260 may be rotated at any desired velocity as preferred by an individual.

As may be seen in FIG. 21, a rear or back view of the rotational light fixture 246 is provided. As may be seen in FIG. 21, the light source is preferably positioned in the standard opening 248. The wire 228 as in electrical communication with the light source and is preferably connected via the standard pin connector 230 for electrical communication with a power source.

Figure 22:
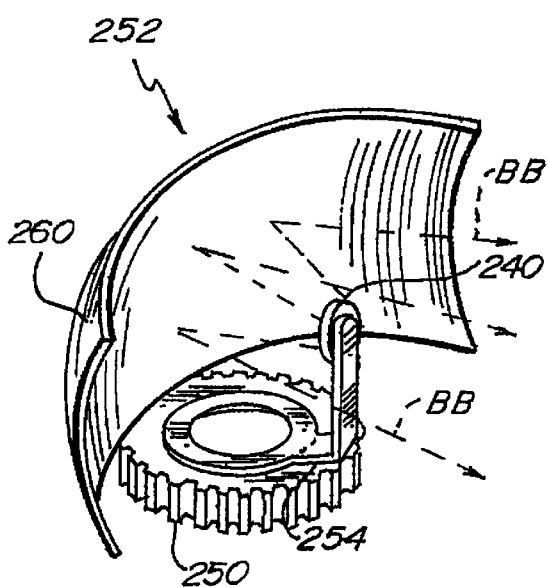
FIG. 22 is a detailed front view of the LED light source mounted to a rotating reflector.

As depicted in FIG. 22, an alternative rotational light fixture 252 is depicted. Rotational light fixture 252 preferably includes a reflector assembly 260 which may be parabolic in shape for the transmission of light along a common axis as depicted by arrows BB for visualization by an individual. In this embodiment, the individual LED module lamps 240 may be positioned to the front of the reflector assembly 260 through the use of a frame 254. The frame 254 may be integral or connected to a gear 250 as desired by an individual. The gear 250 may be driven by a motor for rotation of the light fixture 252. It should be noted that the individual LED module lamps 240 are preferably in electrical communication with a power source not shown.

It should be further noted that the rotational light fixture 252 may also be adapted for the provision of an oscillating or pulsating warning light signal at the preference of an individual.

Figure 23:
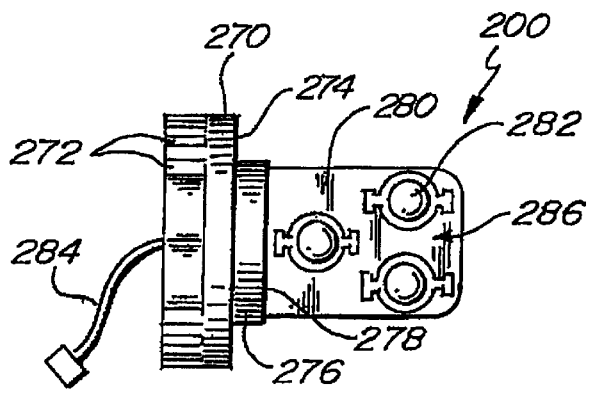
FIG. 23 is a detailed front view of a replacement LED light source.
Figure 24:
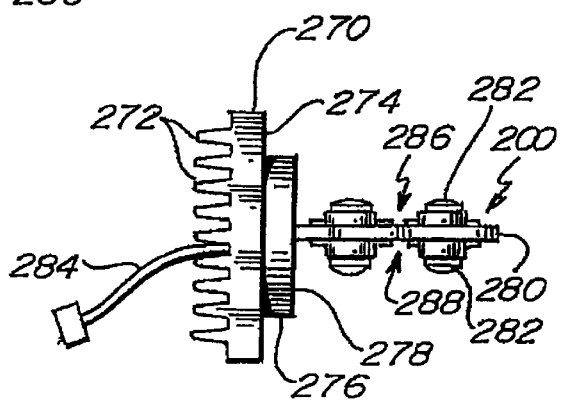
FIG. 24 is a detailed side view of a replacement LED light source.
Figure 25:
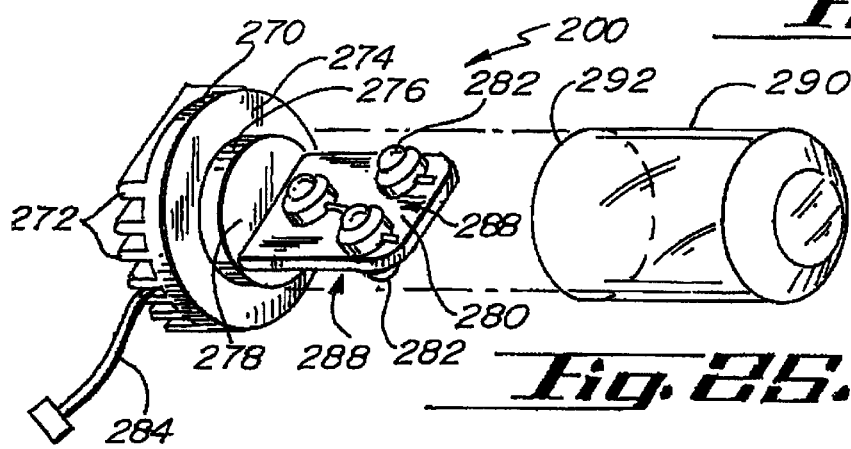
FIG. 25 is a detailed isometric view of a replacement LED light source and cover.

An alternative replacement LED lamp 200 is depicted in FIGS. 23–25. In this embodiment the LED replacement lamp 200 includes a standard mounting base 270. The standard mounting base 270 also preferably includes a plurality of teeth 272. The teeth 272 are preferably adapted for mating coupling with gears integral to a motor and/or reflector 260, or rotational light fixture 246 to facilitate rotation and/or oscillation of the replacement LED lamp 200. The standard mounting base 270 also preferably includes a top surface 274 opposite to the teeth 272.

An upper cylinder portion 276 is preferably adjacent to the top surface 274. The upper cylinder portion 276 preferably includes an upper shoulder 278. Extending upwardly from the upper shoulder 278 is preferably a circuit board, LED mounting surface, or support 280 which preferably includes one or more LED illumination sources 282. The LED illumination sources 282 may be of the same or different colors at the preference of an individual. A wire 284 is preferably in electrical communication with the LED illumination sources 282 to provide for communication and contact with the controller 50 for combination and/or individual illumination of the LED illumination sources 282. A standard plug-in connector may be integral to the wire 284 to facilitate coupling engagement to the controller 50 and/or power source for a vehicle 104.

The circuit board or LED mounting surface 280 is preferably adapted to have a first side 286 and an opposite side 288. Preferably a plurality of LED illumination sources 282 are disposed on both the first side 286 and the opposite side 288 of the replacement lamp 200.

A glass dome or protector 290 is preferably adapted for positioning over the circuit board or LED mounting surface 280 for sealing engagement to the top surface 274 of the standard mounting base 270. The glass dome 290 may be formed of transparent plastic material or a transparent or silicate glass material capable of withstanding heat stress at the preference of an individual. It should be further noted that the glass dome 290 preferably protects the circuit board or LED mounting surface 280 and the LED illumination sources 282 from contamination and from exposure to moisture during use of the replacement lamp 200. In this regard, the sealing lip 292 of the glass dome 290 preferably is securely affixed to the top surface 274 to effectuate sealing engagement therebetween. The outer diameter of the glass dome 290 is preferably about one inch which is sized to fit within the conventional opening 248 in a typical lamp fixture or reflector assembly 260.

The replacement lamp 200 depicted in FIGS. 23, 24, and 25 is also adapted to be positioned in a one inch light receptacle opening 248 which has been placed into a reflector assembly 260. Illumination of one or more individual LED illumination sources 282 as disposed on the circuit board or LED mounting surface 280 enables the replacement lamp 200 to take on the appearance of a warning signal or emergency signaling lamp.

The replacement lamp as depicted in FIGS. 23, 24, and 25 may alternatively permit the circuit board 280 to extend below the upper shoulder 278 to facilitate affixation and positioning relative to the standard mounting base 270.

The controller 50 may regulate the illumination of the LED light sources 282 individually, or in combination, to provide a desired warning lighting effect for the replacement lamp 200. Also, the controller 50 may illuminate the LED light sources 282 individually, or in combination, independently with respect to the first side 286 and the opposite side 288 to provide different warning light effects to be observed by an individual. The controller 50 may also simultaneously or independently regulate the power intensity exposed to the LED illumination sources 282 to provide for a modulated or variable light intensity for observation by an individual. It should also be noted that the LED illumination sources 282 may be formed of the same or different colors at the preference of an individual to provide a desired type of warning light effect for the replacement lamp 200.

In an alternative embodiment, the LED warning signal lamps 10 or LED replacement lamps 200 may be electrically coupled to a controller 50 which in turn is used to provide a modulated power intensity for the light source. A modulated power intensity enables the provision of variable power output or patterns of illumination for creation of a plurality of visually distinct warning light signals without the use of mechanical devices. In these embodiments, the controller 50 illuminates selected light sources 282 and the controller 50 may also regulate and/or modulate the power supplied to the light source 282 thereby varying the intensity of the observed light. In addition, the controller 50 may modulate the power supplied to the LED warning signal lamps 10 or LED replacement lamps 200 in accordance with a sine wave pattern having a range of 0 to full intensity. At the instant of full intensity, the controller 50 may also signal or regulate a power burst for observation by an individual. The controller 50 operating to regulate and/or modulate the power intensity for the warning signal lamps 10 or LED replacement lamps 200 in conjunction with illumination and non-illumination of selected light sources 282 may establish the appearance of a rotational warning light signal or pulsating light signal without the necessity of mechanical rotational or oscillating devices. The current draw requirements upon the electrical system of an emergency vehicle 104 is thereby significantly reduced. Spatial considerations for an emergency vehicle are also preferably optimized by elimination of mechanical, rotational and/or oscillation devices.

The controller 50 may also regulate the modulated power intensity for the provision of a unique variable warning light effect. The unique variable intensity light source is not required to cycle through a zero intensity phase. It is anticipated that in this embodiment that the range of intensity will cycle from any desired level between zero power to full power. A range of power intensity may be provided between thirty percent to full power and back to thirty. percent as regulated by the controller 50. It should also be further noted that an irregular pattern of variable power intensity may be utilized to create a desired type of non-repetitive warning light effect. In addition, the controller 50 may also sequentially illuminate adjacent columns 32 to provide a unique variable rotational, alternating, oscillating, pulsating, flashing, and/or combination variable rotational, alternating, pulsating, oscillating, or flashing visual warning light effects. A pulsating warning light signal may therefore be provided through the use of modulated power intensity to create a varying visual illumination or intensity effect without the use of rotational or oscillating devices. The controller 50 may also modulate the power intensity for any combination of light sources 30 or 282 to provide a distinctive or unique type of warning light signal.

The use of a controller 50 to provide a modulated power intensity for a light source may be implemented in conjunction with replacement lamps 200; flexible circuit boards having LED light sources 30; paneled circuit boards or LED mounting surfaces having LED light sources 30; light bars 70, having LED light sources 30; a cylindrical, square, rectangular, or triangular-shaped circuit boards having LED light sources 30; modules 606, and light supports 602, as seen in FIGS. 33 and 38–40, and/or any other type or shape of LED light sources including but not limited to the types depicted in FIGS. 1–42 herein.

Further, the controller 50 may be utilized to simultaneously provide modulated or variable light intensity to different and/or independent sections, areas, and/or sectors of a light source. Also, the controller 50 may be utilized to simultaneously provide modulated or variable light intensity to different and/or independent sectors, areas, and/or sections of the forward facing side or rearward facing side of the light bar 70 for the provision of different warning light signals or a different warning light effects on each side. In this embodiment it is not required that the forward facing and rearward facing sides of the light bar 70 emit the identical visual patterns of illuminated light sources 30. The controller 50 may regulate and modulate the variable light intensity of any desired sector of the forward facing side independently from the rearward facing side or sector of the light bar 70. The controller 50 may thereby provide any desired pattern and/or combination of patterns of warning light signals through the utilization of variable and/or modulated light intensity for the forward facing side, and a different type or set of patterns and/or combination of patterns of warning light signals having variable or modulated light intensity for the rearward facing side of the light bar 70 as desired by an individual. It should be further noted that an infinite variety of patterns and/or combinations of patterns of warning light signals may be provided for the forward facing side and the rearward facing side of the light bar 70 a the preference of an individual.

The use of the controller 50 to modulate the power intensity for a light source 30 to provide a unique warning light signal may be utilized within any embodiment of an LED light signal 10, light bar 70 light support, replacement lamp 200 or reflector assembly as described in FIGS. 1–42 herein.

It should be further noted that the modulation of the power intensity for a light source 30 or replacement lamp 200 may be used in conjunction, or as a replacement to, the sequential illumination of rows, columns, and/or individual LED light sources 30 to provide a desired type of unique warning light effect.

The modulated power intensity may be regulated by the controller 50 to create a unique warning light signal within a single sector or in conjunction with multiple separated or adjacent sectors of light bar 70 or a light support for the provision of any desired composite emergency warning light signal. All individual LED light sources 30 within a light bar 70 or light support may be simultaneously exposed to incrementally increased modulated power intensity to provide for an incremental increase in illumination. A power burst at full power may be provided at the discretion of an individual. The modulation of the power intensity in conjunction with the incremental increase in illumination of all LED light sources 30 within light bar 70 or light support may provide the appearance of rotation of a warning light signal when observed by an individual. The power exposed to the individual light sources 30 may then be incrementally decreased at the preference of an individual. It should be noted that the power is not required to be regularly incrementally increased or decreased or terminated. It is anticipated that any pulsating and/or modulated variable light intensity may be provided by the controller 50 to the LED light sources 30.

It should also be noted that all individual LED light sources 30 within a light bar 70 are not required to be simultaneously and incrementally illuminated to provide for the appearance of rotation. For example, a light bar 70 or light support may be separated into one or more distinct segments or sectors which are formed of one or more columns 32 of LED light sources 30. a particular segment may be selected as a central illumination band which may receive the greatest exposure to the modulated or variable power intensity and, therefore, provide the brightest observable light signal. An adjacent segment may be disposed on each side of the central illumination band which in turn may receive modulated or variable power intensity of reduced magnitude as compared to the central illumination band. A pair of removed segments may be adjacent and exterior to the adjacent segments, and in turn, may receive exposure to a modulated power source of reduced intensity as compared to adjacent segments. The number of desired segments may naturally vary at the discretion of an individual. The controller 50 may thereby regulate a power source to provide a modulated or variable power intensity to each individual segment to provide for a unique warning light effect for the light bar 70 or light support.

It should be further noted that light supports 12 may be flat and rigid, pliable, moldable, triangular, cylindrical, partially cylindrical, and/or any other shape as desired by an individual provided that the essential functions, features, and attributes described herein are not sacrificed.

The provision of a modulated power intensity to the light bar 70 or light support may also be coupled with or in combination to the sequential illumination of columns 32 as earlier described. In this situation, the warning light signal may initially be dim or off as the individual columns 32 are sequentially illuminated and extinguished for illumination of an adjacent column or columns 32. The power intensity for the illuminated column or columns 32 may simultaneously be incrementally increased for a combination unique rotational and pulsating modulated or variable warning light signal. In addition, the controller 50 may be programmed to provide the appearance of rotational pulsation and/or oscillation at the discretion of an individual.

Each individual LED light source 30 preferably provides an energy light output of between 20 and 200 or more lumens as desired by an individual.

Each light support 12 may also contain a plurality of rows 34 of individual LED light sources 30. The light supports 12 are preferably in electrical communication with the controller 50 and power supply. The supports 12 preferably are controlled individually to create a desired warning light signal for an emergency vehicle 104 such as rotation, alternating, oscillation, strobe, flashing, or pulsating. Each support 12 may be controlled as part of an overall warning light signal or pattern where individual supports 12 may be illuminated to provide a desired type or combination light signal in addition to the provision of a modulated or variable power intensity for the light source 30.

Modulated power intensity may be regulated by the controller 50 to create the appearance of rotation within a single support 12 or in conjunction with multiple separated, independent or adjacent supports 12 for the provision of a composite emergency warning light signal.

It should be noted that each portion, segment, section, sector, or area of light bar 70 or light support may be controlled as part of an overall warning light signal or pattern where individual sections or sectors may be illuminated to provide a desired type of warning light signal including but not limited to rotation and/or oscillation through the use of a modulated or variable power intensity. Alternatively, the controller 50 may provide for the random generation of light signals without the use of a preset pattern at the preference of an individual.

Controller 50 may be used to selectively activate individual LED's 30 to create a pulsating light signal, a strobe light signal, a flashing light signal, an alternating light signal, and/or an alternating colored flashing light signal for an emergency vehicle.

Controller 50 provides a means for activating LED's 30 individually to allow for greater flexibility in the type of warning light signal created. This embodiment of the invention is also capable of displaying information in a variety of different colors or sequential illumination of colors.

It should be noted that the power provided to the LED light sources is not required to be terminated during transition between repetitive light signals or between illumination of different light signals. For example, individual colors of LED light sources may receive a higher power output to increase illumination as compared to a different color of LED light source to create a preferred lighting effect. It should also be noted that each individual LED light source is not required to receive the same level of power output from the controller 50. Therefore different individual LED light sources may receive different power output levels within a single warning light signal. Individual LED light sources are not required to be simultaneously and incrementally illuminated to provide for the appearance of rotation. It is anticipated that a pulsating and/or modulated variable light intensity may be provided by the controller 50 for regulation of the power output from thirty percent to maximum and back to thirty percent which affords a desirable type of pulsating modulated variable light effect.

Figure 42:
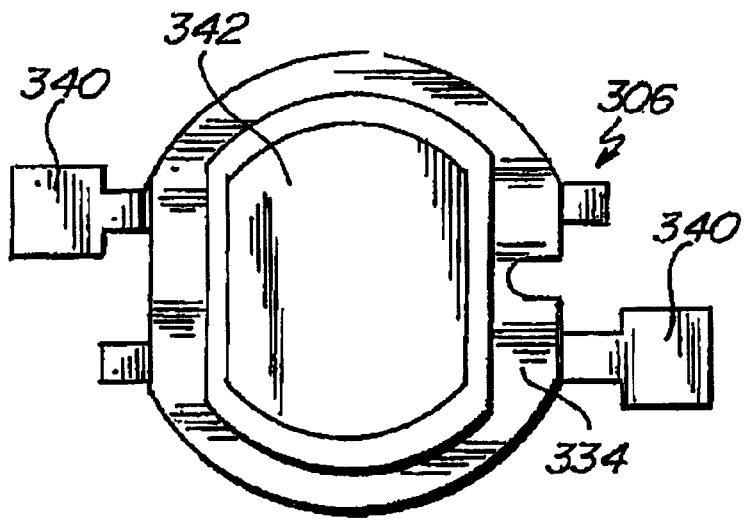
FIG. 42 is a detail bottom view of an LED light source.
Figure 41:
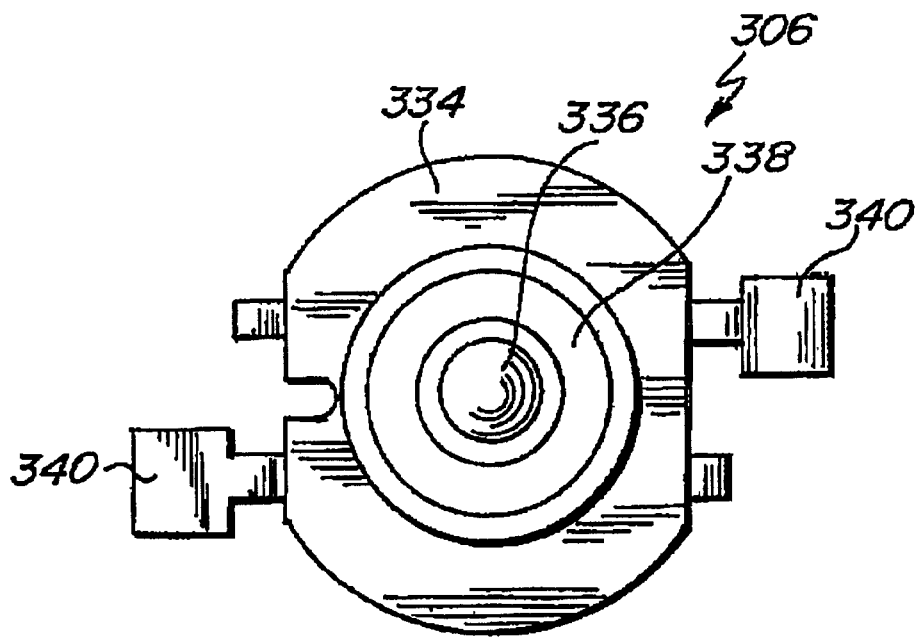
FIG. 41 is a detail top view of an LED light source.

Referring to FIGS. 41 and 42, an individual LED light source 306 is depicted in detail. The LED light source 306 preferably include a ceramic and/or heat resistant base 334. Centrally within the ceramic and heat-resistant base 334 is positioned a light source 336. The light source 336 is preferably enclosed within a protective cover 338. Extending outwardly from the individual light source 306 are a pair of contact paddles 340 which preferably provide for the electrical contacts for illumination of the light sources 336 during use of the individual light sources 306. The back of the LED light source 306 includes a slug 342. The slug 342 is designed to be positioned within circular openings 344 of a circuit board or LED mounting surface 346. The LED light sources 306 as depicted in FIGS. 41 and 42 preferably provide for a light intensity varying between 20 and 200 lumens or higher at the discretion of an individual. The positioning of the slug 342 in the circular openings 344 of the circuit board or LED mounting surface 346 also preferably establishes a heat sink. A heat sink is desirable because the individual LED light sources 306 may have a sufficient level of power output during use to develop heat. As a result, the slugs 342 are positioned within the circular opening 344 and may be fully engaged to an adhesive for affixation to a base. This combination assists in the dissipation of heat during use of the individual LED light sources 306 enhancing the performance of the light support 302.

As earlier described, the brightest or most intense light of the individual LED light sources 306 is provided at an acute angle of approximately 40° to 42°.

Figure 28:
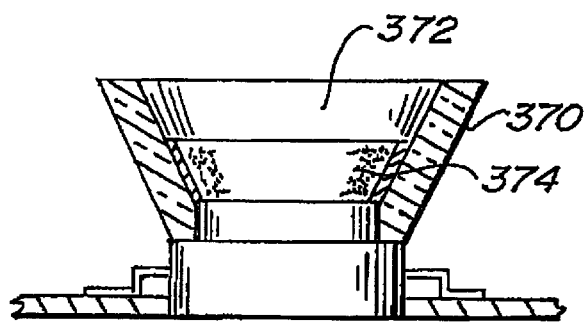
FIG. 28 is an alternative cross-sectional side view of a culminator cup.
Figure 29:
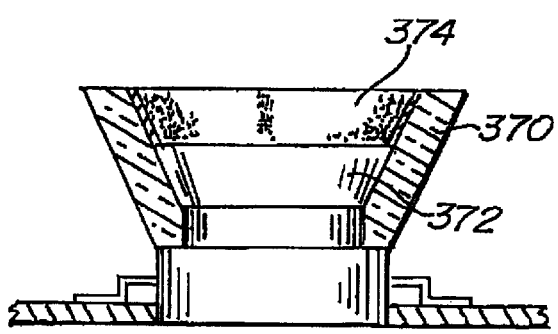
FIG. 29 is an alternative cross-sectional side view of a culminator cup.
Figure 30:
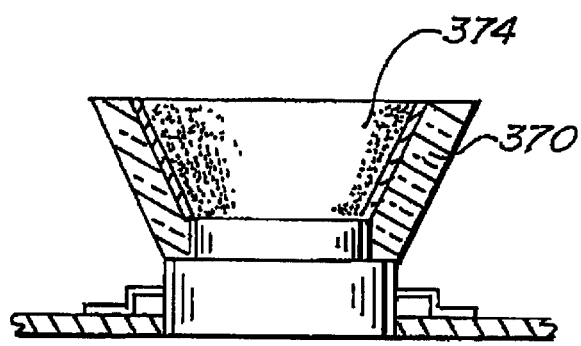
FIG. 30 is an alternative cross-sectional side view of a culminator cup.

Referring to FIGS. 26–30, a reflector or cullminator for the individual LED light sources 306 is disclosed. The reflector or culiminator is indicated in general by the numeral 370. The reflector or cullminator 370 may be conical in shape and may be configured to encircle an individual LED light source 306. The reflector or cullminator 370 may be partially transparent. The reflectors 370 may have a clear section 372 and a reflective section 374. In FIG. 29, the clear section 372 is preferably positioned proximate to the LED light source 306 and the reflective section 374 is preferably positioned to the top of the reflector 370.

In FIG. 28, the reflective section 374 is preferably positioned proximate to the LED light source 306 and the clear section 372 is preferably positioned to the top of reflector or cullminator 370. As may be seen in FIG. 30, the entire interior surface of the reflector or cullminator 370 may be formed of a reflective section 374. It should be noted that any combination of clear sections 372 and reflective sections 374 may be utilized at the discretion of an individual. It should be noted that a plurality of clear sections 374 may be utilized within each reflector or cullminator 370 at the discretion of an individual.

The use of a combination of clear sections 372 and reflective sections 374 enable an individual to select a configuration for the provision of partial illumination along an angle which is not parallel to a desired line of sight. An individual may thereby be able to observe an illuminated light signal from the side or top of a light bar or light support 302 as opposed to being aligned with a desired line of sight.

Each cullminator or reflector cup 370 preferably includes an angled interior surface which extends upwardly and diverges outwardly from a central opening 394. Each central opening 394 is preferably constructed and adapted for positioning proximate to and over an LED light source 306. Each of the cullminator or reflector cups 370 also preferably includes an angled exterior surface which extends upwardly and diverges outwardly from a bottom or base which is preferably positioned approximate to an LED mounting surface or circuit board 346.

Figure 26:
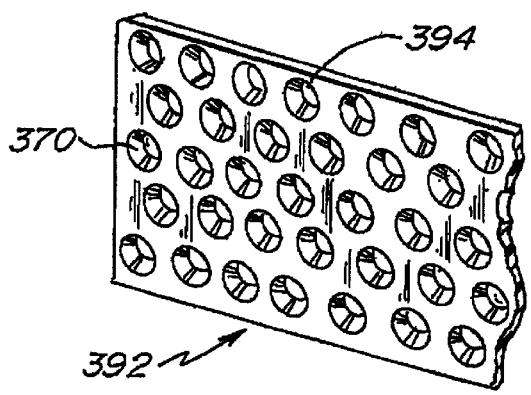
FIG. 26 is a detailed isometric view of a reflector or cullminator.
Figure 27:
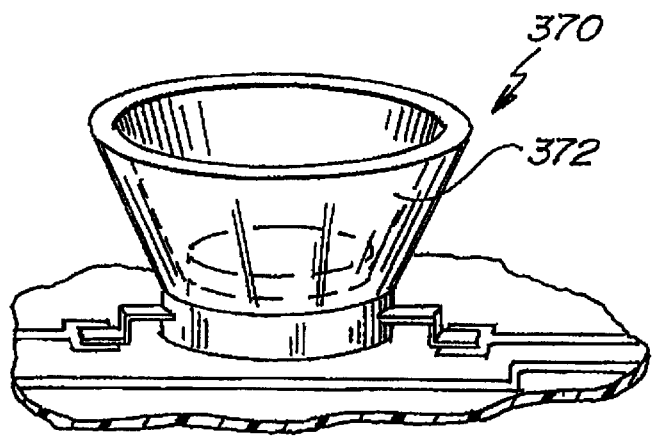
FIG. 27 is a detailed isometric view of a culminator cup.

Referring to FIG. 26 a plurality of cullminator cups or reflectors 370 may be formed into a cullminator assembly or array 392. The cullminator assembly or array 392 is preferably adapted for positioning over an array of LED light sources 306. Examples of arrays of LED light sources 306 which may be utilized with a cullminator assembly 392 are depicted in at least FIGS. 3–10, 12, 14, 15, 23–25, 31, and 32.

Each cullminator array 392 is preferably formed of a reflective material which has plurality of reflective cups 370 disposed therethrough. Each opening 394 is adapted for positioning over an LED light source 306. The cullminator array 392 preferably has a sufficient thickness to establish an interior reflective surface having a sufficient dimension to reflect light as emitted from the LED light sources 306. Alternatively, the interior surface of each reflector cup 370 may be entirely or partially coated with reflective material at the discretion of an individual. It should be noted that the entire cullminator assembly 392 is not required to be formed of reflective material if the interior surface of the reflector cups 370 are coated with reflective material.

The cullminator array 392 may be formed in any shape as desired by an individual including but not necessarily limited to square, rectangular, triangular, linear, circular, oval, and special or other irregular shapes for use in reflecting light emitted from an LED light source 306. The interior surface of any desired number of cullminator cups 370 may also be coated with any pattern or stripes of reflective 374 and non-reflective 372 sections as earlier described.

Figure 31:
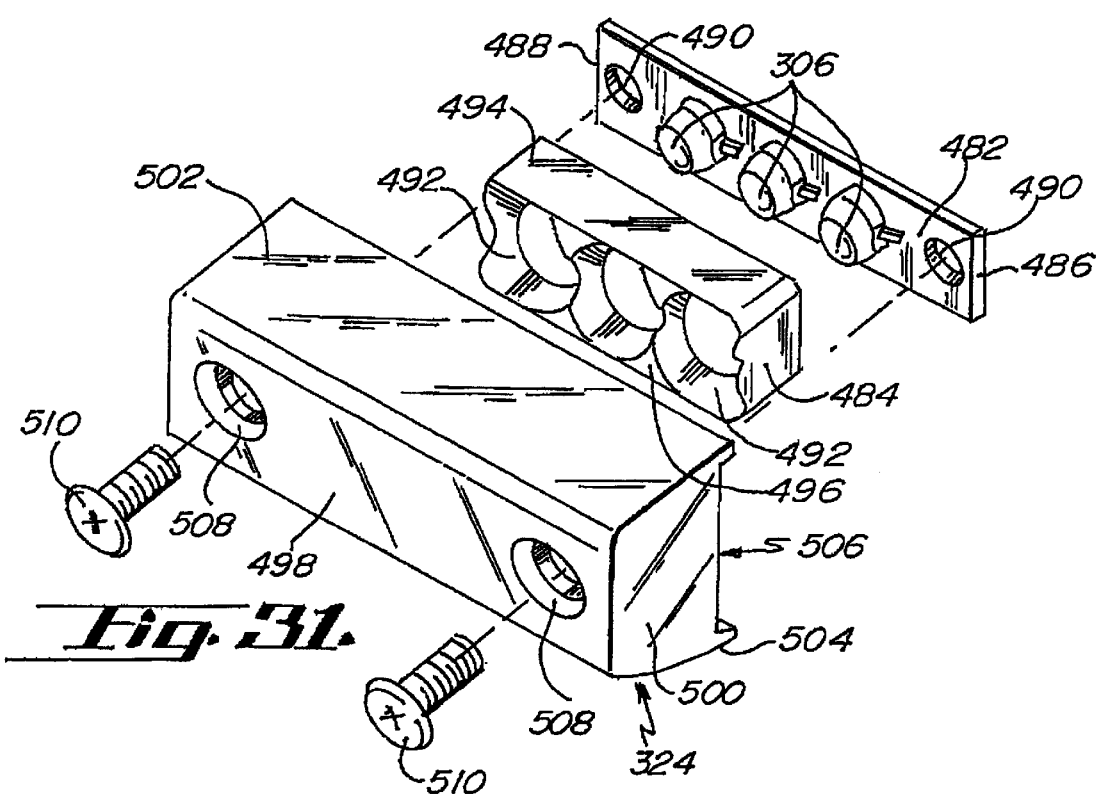
FIG. 31 is an exploded isometric view of an alternative culminator assembly and LED light source.
Figure 32:
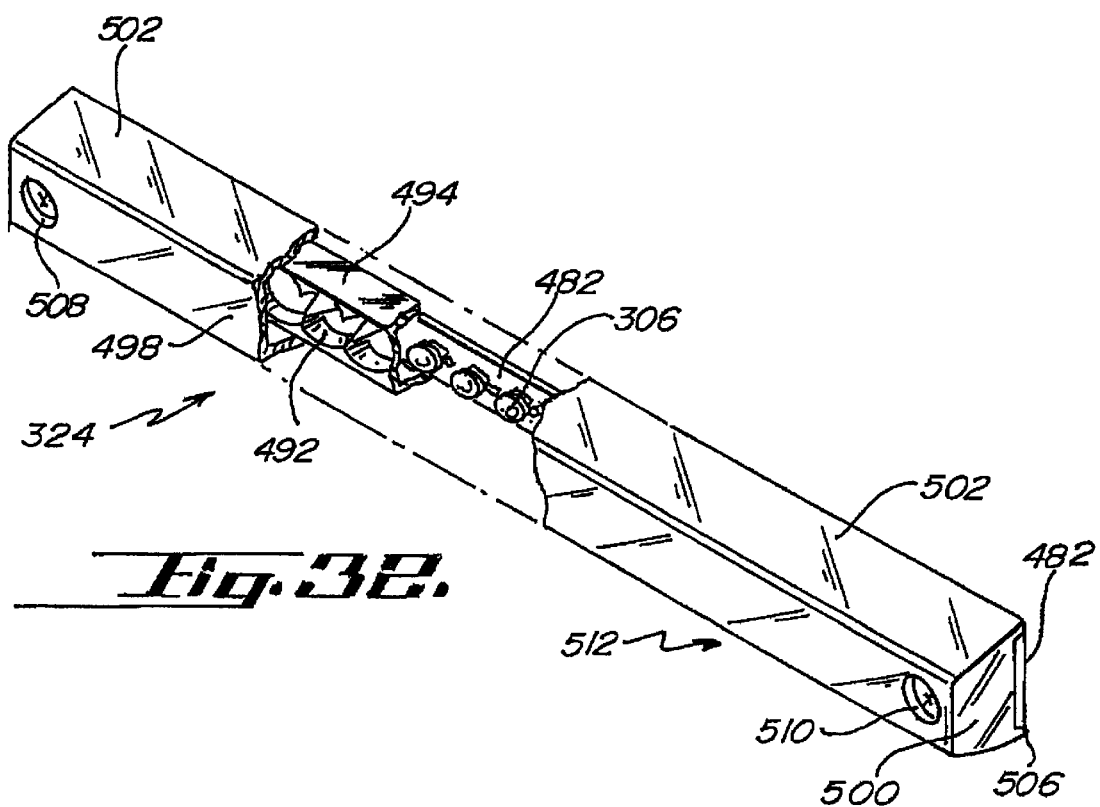
FIG. 32 is an alternative partial cut-away isometric view of a culminator assembly and LED light source.

Referring to FIGS. 31 and 32 a modular light support 480 in general includes an LED mounting surface 482 having one or more LED light sources 306, a cullminator assembly 484 and a cover 324.

The LED mounting surface 482 is preferably elongate and includes a plurality of LED light sources 306. In general, one to five LED light sources 306 are disposed in a linear orientation along the LED mounting surface 482 which may be a circuit board as earlier described. The LED mounting surface 482 also preferably includes a first end 486 and a second end 488. An opening 490 is preferably positioned through the LED mounting surface 482 proximate to each of the first end 486 and second end 488.

The culiminator assembly 484 preferably includes a plurality of reflector cup areas 492. The cullminator assembly 484 preferably includes a plurality of support walls 494 and a top surface 496. The cullminator assembly 484 also preferably includes a plurality of openings 490. Each of the openings 490 is preferably sized to receivingly position and hold the individual LED light source 306 during assembly of the modular light support 480. The reflector cup areas 492 are preferably equally spaced along the cullminator 484 to correspond to the spacing between the individual light sources 306 as disposed on the LED mounting surface 482.

The cover 324 is preferably transparent permitting transmission of light emitted from the LED light supports 306 therethrough. The cover 324 preferably includes a forward face 498, a pair of end faces 500, a top face 502 and a bottom face 504. Each of the pair of end faces 500 preferably includes a receiving notch 506 which is adapted to receivingly engage the LED light mounting surface 482 during assembly of the modular light support 480. An affixation opening 508 preferably traverses the forward face 498 proximate to each of the pair of end faces 500. A fastener 510 preferably passes through the affixation opening 508 for engagement to the opening 490 to secure the LED mounting surface 482 into the receiving notch 506. It should be noted that the cullminator assembly 484 is then positioned within the interior of the cover 324 where the top surface 496 is proximate to the forward face 498. The illumination of the LED light sources 306 then transmits light through the forward face 498 for observation of an emergency warning light signal.

Specifically referring to FIG. 32 one or more modular light supports 480 may be positioned adjacent to each other for the creation of a light bar or light stick 512. The modular light supports 480 and/or light bar or light stick 512 may be coupled to a controller 50 which may independently and/or in combination provide a plurality of independent and visually distinct warning light signals as earlier described. In addition, the controller 50 may provide modulated and/or variable power intensity to the individual LED light sources 306 to establish unique warning light signal effects. It should also be noted that the controller 50 may individually illuminate LED light sources 306 to provide for one or a combination of colored light signals as desired by an individual.

Any number of modular light supports 480 may be positioned adjacent to each other to comprise a light bar or light stick 512 at the preference of an individual. It should be further noted that a plurality of modular light supports 480 may be positioned at any location about the exterior or within the interior of a vehicle at the discretion of an individual. In one embodiment each of the individual modular light supports 480 will be electrically coupled to a power supply and controller 50 for the provision of unique individual and visually distinctive warning light signals and combination warning light signals as earlier described.

LED technology enables the selection of a desired wave length of light energy for transmission from the individual LED light sources 306. Any wave length of visible or non-visible light is available for transmission from the LED light sources 306. As such, generally no filters are required for use with individual LED light sources 306. The individual LED light sources 306 may be selected to provide for any desired color normally associated with the use in emergency vehicles such as amber, red, yellow, blue, green and/or white.

The controller 50 described herein is very versatile. The controller 50 may simultaneously display any number of combinations of warning light signals. For example, the controller 50 may provide for a solitary light signal for transmission from a light source. Alternatively, the controller 50 may enable the transmission of two signals simultaneously from the identical light source where a first warning light signal is emitted from one portion of the light source and a second warning light signal is emitted from a second portion of the light source. Alternatively, the controller 50 may alternate the two warning light signals where the first area of the light source first transmits a first warning light signal and secondly the first area of the light source then transmits a second warning light signal. The second area of the light source may initially transmit a second warning light signal and then the second area may transmit the first warning light signal. Further, the controller 50 may transmit two independent and visually distinct warning light signals simultaneously within different areas of light source. The controller 50 may also reverse the warning light signals for simultaneous transmission between different areas of the light source. Further, the controller 50 may regulate the transmission of more than two visually distinct types of warning light signals from a light source at any given moment. The controller 50 may alternate warning light signals within different areas or enable transmission of warning light signals in reverse alternating order for the creation of an infinite variety of patterns of visually distinct warning light signals for use within an emergency situation. The controller 50 may also permit the transmission of a repetitive pattern of warning light signals or a random pattern of visually distinct warning light signals at the preference of an individual. The patterns may be formed of one, two, three, or more different types of light signals at the preference of an individual.

Figure 33:
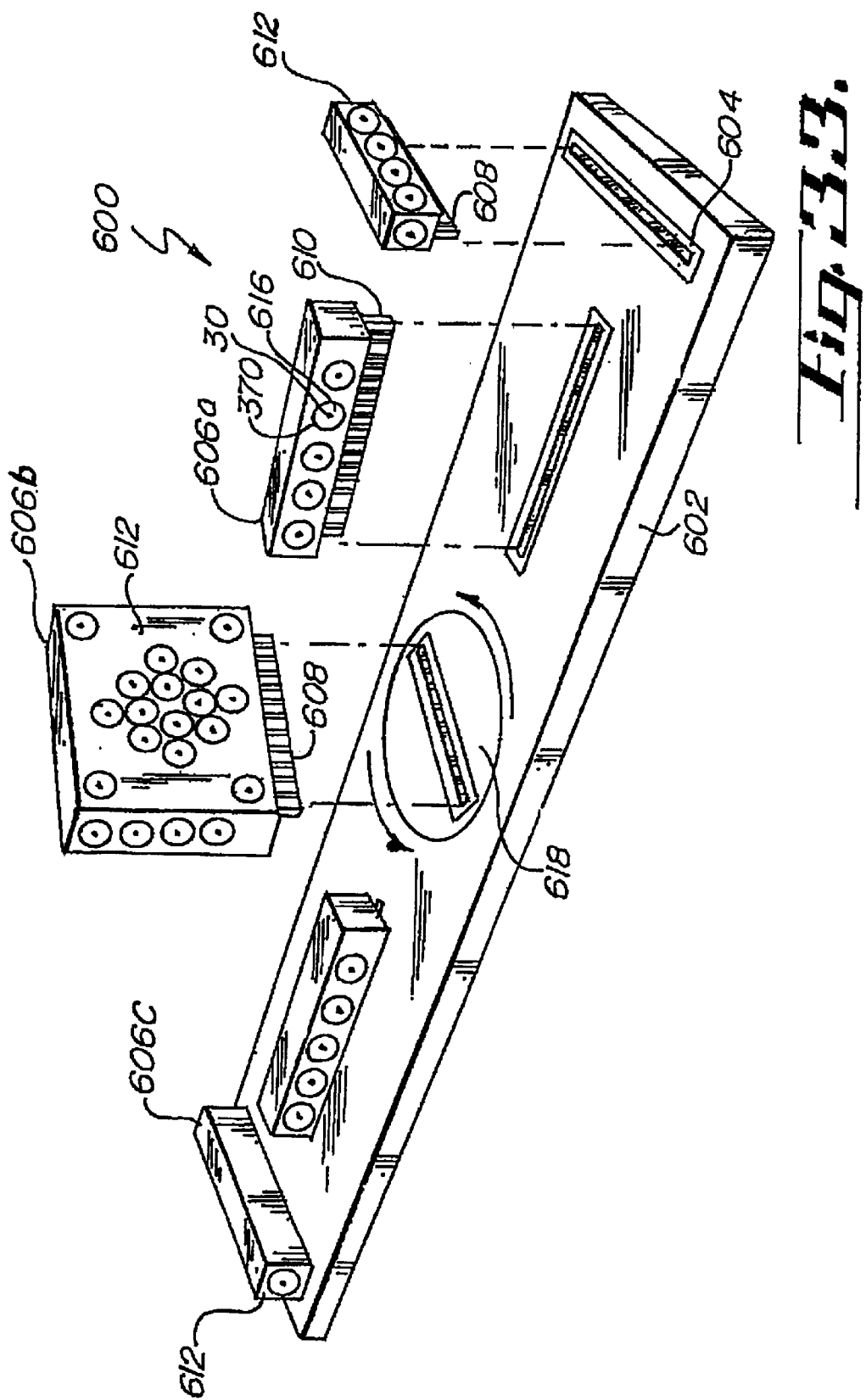
FIG. 33 is a perspective view of a modular warning light signal according to an embodiment of the invention.

Turning to the embodiment shown in FIG. 33. FIG. 33 shows a possible configuration of a warning signal light 600 having modular components. In the embodiment shown a light support 602 has a plurality of module receiving ports 604. The module receiving ports 604 are constructed and arranged to provide electrical communication respectively to a module support member 610 of a module 606 received therein. Each of the module support members 610 may be made up of connection teeth or contacts 608 which electrically contact and engage the receiving ports 604 when inserted therein. Each module 606 has at least one visible light signal display surface 612 which has one or more light sources 30 removably mounted thereon. Preferably the light sources 30 are light emitting diodes, such as have been previously discussed. About each light source 30 may be a cullminator 370 as earlier described. Furthermore, each cullminator 370 may include a reflective surface 616 at least partially disposed thereon. Reflector 616 more efficiently direct the light emitted from light source 30 in a desired direction. In an additional embodiment of the invention the reflector 616 may be adjustable so as to redirect and/or focus light emitted from the light source 30 during use. Also, the visible surface 612 or the individual cullminator cup 370 and reflectors 616 may also have one or more lenses equipped thereon to provide the warning signal light with the ability to magnify and/or diffuse emitted light as may be desired.

In the embodiment shown, the module support members 610 and the module receiving ports 604 respectively are uniform in size. The uniformity of the ports 604 and the members 610 allows modules 606 to be readily replaced and also provides the invention with the capacity to have variously sized and shaped modules 606 to be interchanged and arranged in various configurations as desired by a user. For example a relatively elongated module, such as is indicated by reference numeral 606a, could be positioned in any of the various ports 604 shown and could likewise be replaced with any other module such as the more vertically oriented module 606b, or the remaining module type 606c. Such modularity and standardization of connections provides the present invention with a tremendous variety of module configurations which may be readily reconfigured as desired.

In addition to providing a variety of module types, the present invention also provides for a variety of mechanisms to be associated with the ports 604. In the embodiment shown for example, a rotation mechanism 618 has a port 604 mounted thereon. Any number of rotation mechanisms could be included on the surface of the support 602 such as is shown. Alternatively a similar mechanism or mechanisms could be included on one or more surfaces of a module to provide a dedicated rotation module. The rotation mechanism 618 could also be configured as a gyrator or other motion producing device.

It must also be noted however that the three types module varieties 606a, 606b and 606c presently shown and described are merely three examples of potential module sizes and shapes. It should be understood that modules 606 may be configured in any size or shape as desired. As indicated above, in order to ensure the greatest ease of use and elegance in design, it may be desirable to provide the various modules 606 with uniform support members 610 and also provide the support 602 with similarly uniform ports 604. However, in order to ensure that only certain module types are utilized in certain ports, it is recognized that the present invention could also utilize a support 602 having a variety of port 604 configurations with modules 606 having module supports 610 sized to correspond with specific ports and/or ports 604.

In keeping with the modular construction of the present invention, it should also be understood that the support 602, like most of the components thus described could be embodied in a variety of shapes and sizes. Preferably, the support 602 is a circuit board with a number of ports 604 included thereon. In one aspect of the invention, the support 602 could be embodied as several supports with each support having a unique arrangement of modules and light sources. The electronic schematics shown in FIGS. 34–37 show some possible configurations and their associated electronic connections between the various components of the invention.

Figure 34:
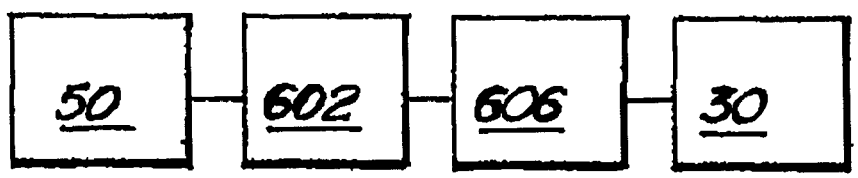
FIG. 34 is a block diagram of an electrical schematic of an embodiment of the invention.
Figure 35:
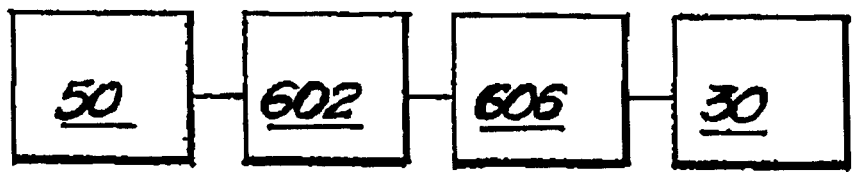
FIG. 35 is a block diagram of an electrical schematic of an embodiment of the invention.

Starting in FIG. 34, an embodiment of the invention is showed where the controller 50 is in electronic communication with one or more supports 602, which are in turn in electronic communication with one or more modules 606, which are in turn in electronic communication with one or more light sources 30. FIG. 35 shows a similar series of electric pathways, but in the present embodiment the controller 50 may also be in direct electric communication with each of the various components, support(s) 602, module(s) 606 and light source(s) 30, independent of one another.

Figure 36:
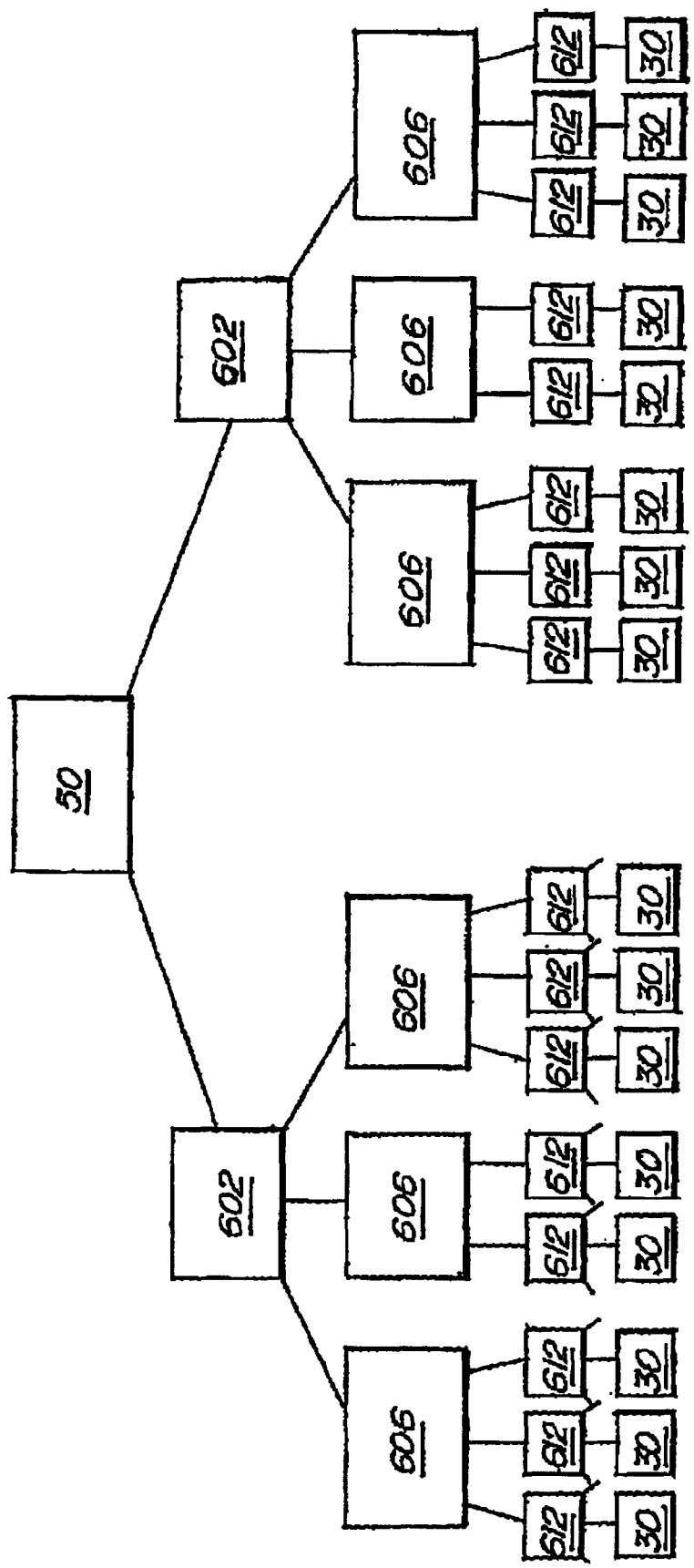
FIG. 36 is a block diagram of an electrical schematic of an embodiment of the invention.

In the embodiment shown in FIG. 36, the individual visible surfaces 612 of the various modules 606 may be controlled by the controller 50. Though not indicated in the schematic, the various components: supports 602, modules 606, visible surfaces 612 and light sources 30 may be independently controlled by the controller 50 or may be selectively activated via the electronic pathway shown.

Figure 37:
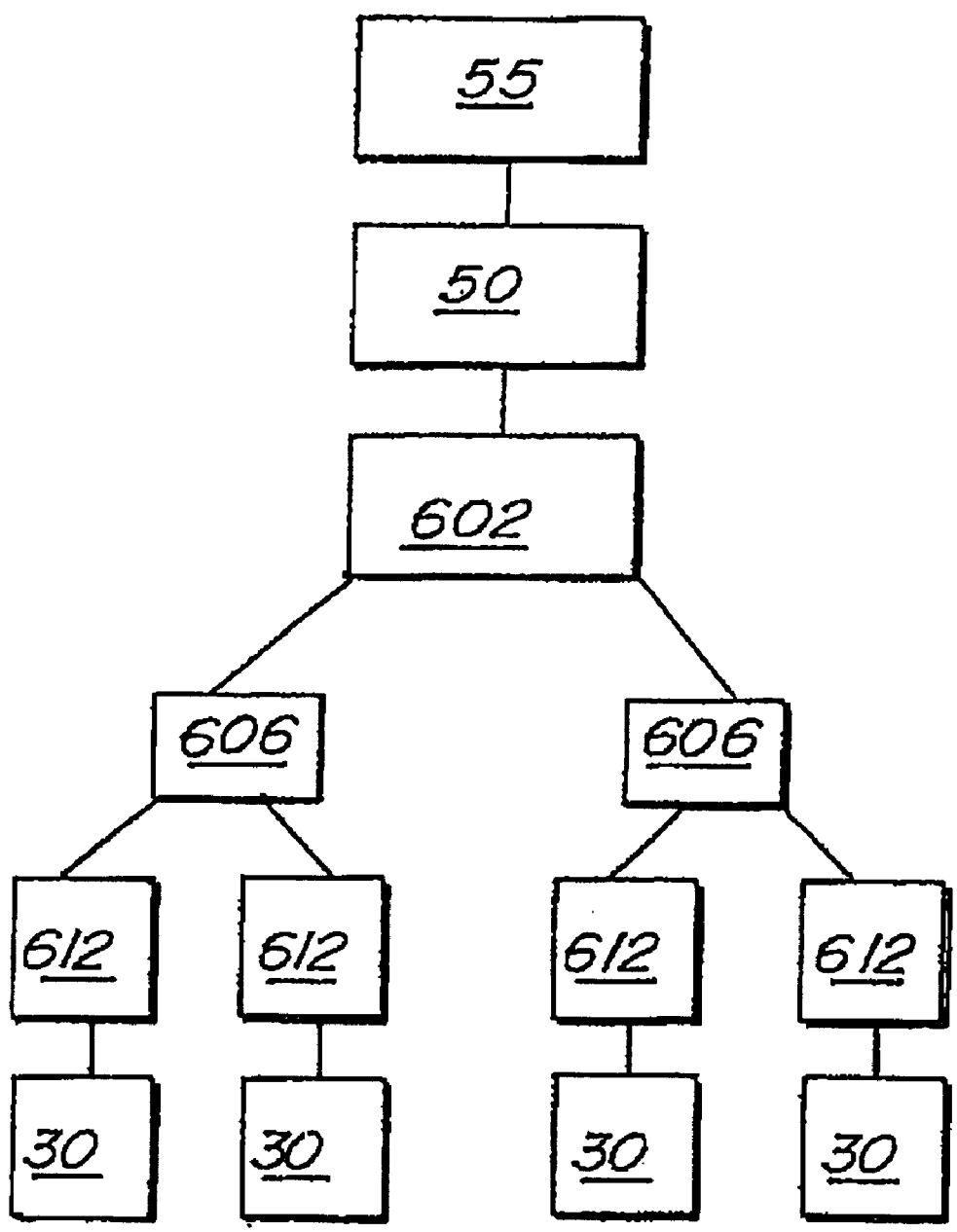
FIG. 37 is a block diagram of an electrical schematic of an embodiment of the invention.

In the embodiment shown in FIG. 37, a support 602 includes a controller 50. Each controller 50 is in electronic communication with an external controller 55 in the manner previously discussed above. The embodiment shown in FIG. 37 could include numerous independently controlled supports 602 which are in communication with the external controller 55. It should be noted that individual controllers 55 could also be included with each modules 606 to provide for a warning signal light having numerous predetermined light signals or patterns which could be displayed by sending a single signal from the external controller 55 to the various controllers 50.

In reference to the various embodiments shown in FIGS. 34–37, one of ordinary skill in the art will recognize that additional components could be added to any of the various embodiments shown and that numerous configurations other than those shown or described could be created. The present invention is directed to all possible arrangements of the various components described herein regardless of the number, type or arrangement of the components described herein.

It should also be noted that the controller 50 and/or external controller 55 described in relation to FIGS. 34–37 may provide modulated and/or variable power to individual light sources 30 or modules 606 as earlier described. It should also be noted that the controller 50 or external controller 55 may selectively illuminate any combination of individual light sources 30 or modules 606 to provide an infinite variety of patterns and/or combinations of patterns for a warning light signal independently of, or in combination with, the provision of modulated or variable power intensity as earlier described.

Figure 38:
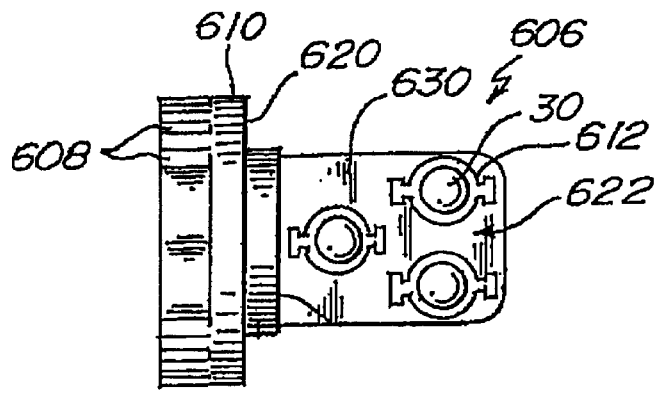
FIG. 38 is a detailed front view of a modular replacement LED light source.
Figure 39:
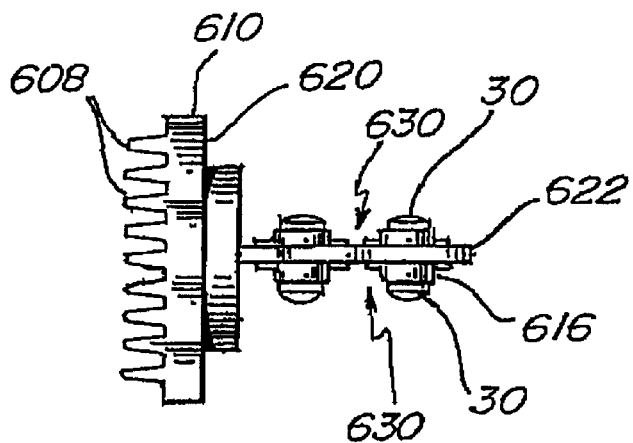
FIG. 39 is a detailed side view of a modular replacement LED light source.
Figure 40:
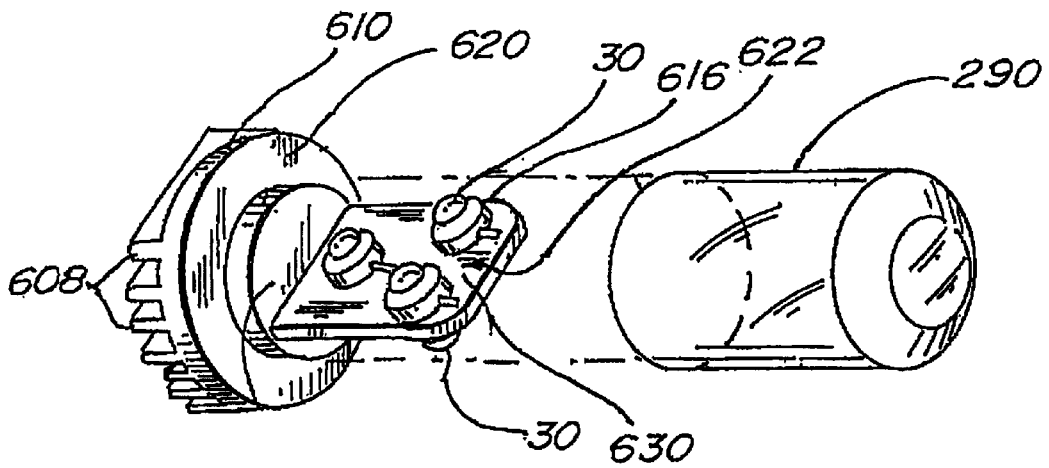
FIG. 40 is a detailed isometric view of a modular replacement LED light source and cover.

Turning to FIGS. 38–40, several views of an example of a module 606 is shown. Typically, a module will include a base portion 620 and light mounting portion 622. The base portion 620 will include the support member 610 which will typically include a plurality of electric contacts 608. The support member 610 and the electric contacts 608 are removably engageable to a port 604 as previously described. The contacts 608 provide the module 606 with an electric path to the support 602 and controller 50 such as is shown in FIGS. 27–37.

The light mounting portion 622 preferably is a vertically oriented circuit board 630 which includes one or more light sources 30 and associated cullminator cups 370 with reflective surfaces 616 removably mounted thereon. The light sources are preferably LEDs. As shown in FIG. 33 the light mounting portion 622 may be enclosed in a transparent cover or dome such as protector 290.

In addition to being directed to the embodiments described above and claimed below, the present invention is further directed to embodiments having different combinations of the features described above and claimed below. As such, the invention is also directed to other embodiments having any other possible combination of the dependent features claimed below.

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A modular warning signal light system comprising:
at least one support, the at least one support having at least one module receiving port;
at least one module, the at least one module having at least one visible side, the at least one visible side having at least one light emitting diode light source engaged thereto, the at least one module having at least one support engagement member, the at least one support engagement member constructed and arranged to be removably received by the at least one module receiving port, the at least one module and the at least one light emitting diode light source in electric communication with one another and with the at least one support; and
a controller, the controller in electric communication with the at least one support, the at least one module and the at least one light emitting diode light source, the controller constructed and arranged to selectively activate the at least one light emitting diode light source to create at least one warning light signal, the controller constructed and arranged to provide variable illumination intensity to each of the at least one support, the at least one module and the at least one light emitting diode light source wherein the variable illumination intensity provides the at least one warning light signal with non-constant luminosity.

2. The system of claim 1 wherein the controller is in further electrical communication with a power source of an emergency vehicle, the controller adapted to vary illumination intensity provided to the selectively activated at least one light emitting diode light source.

3. The system of claim 2 wherein the at least one light emitting diode light source is a plurality of light emitting diodes.

4. The system of claim 2 wherein the at least one receiving port is a plurality of receiving ports.

5. The system of claim 4 wherein the at least one module is a plurality of modules.

6. The system of claim 5 wherein the controller selectively activates the at least one light emitting diode light source on the at least one visible side of the plurality of modules to thereby produce a plurality of warning light signals.

7. The system of claim 6 wherein the controller is in independent electrical communication with each of the light emitting diode light sources.

8. The system of claim 7 wherein the plurality of light emitting diode light sources are independently and selectively activated thereby providing at least one warning light signal to be displayed from each of the visible surfaces.

9. The system of claim 8 wherein at least two visible surfaces display warning light signals which are different from one another.

10. The system of claim 9 wherein the plurality of light emitting diode light sources on each of the modules are selectively activated thereby providing each of the plurality of modules with at least one warning light signal.

11. The system of claim 10 wherein at least two modules display warning light signals which are different from one another.

12. The system of claim 7 wherein the at least one support is a plurality of supports.

13. The system of claim 12 wherein each of the plurality of light supports is selectively activated thereby activating the plurality of modules and the plurality of light emitting diode light sources thereon to produce at least one predetermined warning light signal.

14. The system of claim 2 wherein the at least one module is a circuit board.

15. The system of claim 2 wherein the at least one support is a circuit board.

16. The system of claim 1, wherein the controller is constructed and arranged to selectively activate the at least one light emitting diode light source to create at least two warning light signals of the group consisting of: a flashing light, a stationary light, a simulated revolving light, a simulated oscillating light, a strobe light, a modulated light, a variable light, a pulsating light, a directional indicator, and any combinations thereof.

17. The system of claim 2, wherein the controller is constructed and arranged to selectively activate the at least one light emitting diode light source to create at least two warning light signals of the group consisting of: a flashing light, a stationary light, a simulated revolving light, a simulated oscillating light, a strobe light, a modulated light, a variable light, a pulsating light, a directional indicator, and any combinations thereof.

18. The system of claim 2, wherein the at least one support is constructed and arranged to be engaged to a surface of the emergency vehicle.

19. The system of claim 1, the at least one support having a plurality of visible support sides, each of the visible support sides having at least one module receiving port.

20. The system of claim 19 wherein the controller is constructed and arranged to selectively activate the at least one light emitting diode light source to create at least one warning light signal on each of the plurality of visible support sides, wherein the at least one warning light signal of each of the visible support sides is different.

* * * * *